United States Patent [19]
Saito et al.

[11] Patent Number: 5,851,422
[45] Date of Patent: Dec. 22, 1998

[54] POLYMERIC MATERIAL FOR LIQUID CRYSTAL/POLYMER COMPOSITE FILM, RECORD DISPLAY MEDIUM, AND USE THEREOF

[75] Inventors: Wataru Saito; Atsushi Baba; Tadafumi Shindo; Naoki Shimada; Hidetoshi Ozawa; Yoshinori Kinase, all of Tokyo-To; Tisato Kajiyama, Fukuoka; Yasuhiro Imamura, Aichi-Ken; Norihiro Kaiya, Ishige-Machi; Yoshitaka Goto, Yawara-Mura, all of Japan

[73] Assignee: Dai Nippon Printing Co., Ltd., Tokyo, Japan

[21] Appl. No.: 797,138

[22] Filed: Feb. 10, 1997

[30] Foreign Application Priority Data

Feb. 13, 1996 [JP] Japan .................................. 8-049445

[51] Int. Cl.[6] .......................... C09K 19/52; C09K 19/12
[52] U.S. Cl. ............................... 252/299.01; 252/299.66; 252/299.67
[58] Field of Search ..................... 252/299.01, 299.66, 252/299.67

[56] References Cited

U.S. PATENT DOCUMENTS

| | | | |
|---|---|---|---|
| 5,354,498 | 10/1994 | Akashi et al. | 252/299.01 |
| 5,422,036 | 6/1995 | Kawakami et al. | 252/299.01 |
| 5,426,009 | 6/1995 | Coates et al. | 430/20 |
| 5,437,811 | 8/1995 | Doane et al. | 252/299.01 |
| 5,498,450 | 3/1996 | Akashi et al. | 428/1 |
| 5,518,654 | 5/1996 | Coates | 252/299.66 |
| 5,589,237 | 12/1996 | Akashi et al. | 428/1 |
| 5,620,630 | 4/1997 | Ohnishi et al. | 252/299.01 |
| 5,645,758 | 7/1997 | Kawasumi et al. | 252/299.01 |

*Primary Examiner*—C. H. Kelly
*Attorney, Agent, or Firm*—Morgan & Finnegan, L.L.P.

[57] ABSTRACT

A record display medium is provided which can offer a high display contrast and is less likely to cause a lowering of contrast or disappearance of display even in low temperature and high temperature regions. A polymeric material for a liquid crystal/polymer composite film comprising a liquid crystal present in a polymer matrix, a liquid crystal/polymer composite film using the material, and use of the record display medium are also provided. The polymeric material for a liquid crystal/polymer composite film comprising a liquid crystal present in a polymer matrix has a glass transition temperature of 150° C. or above and is insoluble in water.

38 Claims, 3 Drawing Sheets

POLYMERIC MATERIAL FOR LIQUID CRYSTAL/POLYMER COMPOSITE FILM, RECORD DISPLAY MEDIUM, AND USE THEREOF

BACKGROUND OF THE INVENTION

The present invention relates to a polymeric material useful for constructing a liquid crystal/polymer composite film, which is responsive to an electric field and heat and can display or record information, a liquid crystal/polymer composite film using the polymeric material, a record display medium using the composite film, and use of the record display medium. The record display medium can be widely used as rewritable cards, displays, and other record display media.

Conventional liquid crystal display devices use a nematic liquid crystal as a liquid crystal and features including low power consumption, lightweight, and small thickness. By virtue of these features, they have been widely used as a display medium for letters and images in watches, electronic calculators, personal computers, televisions and the like. For general TN and STN liquid crystal display devices, a liquid crystal is filled into a liquid crystal cell comprising two glass plates, with a transparent electrode, and a predetermined seal provided between the two glass plate, and polarizing plates are put on respective both sides of the liquid crystal cell so that the liquid crystal cell is sandwiched between the polarizing plates.

The above display devices have problems including that (1) necessity of using two polarizing plates results in small viewing angle and insufficient brightness results in unsatisfactory visibility, (2) the dependency upon the cell thickness is so large that it is difficult to realize a display having a large area, (3) a complicate structure of the device makes it difficult to fill a liquid crystal into the cell, posing problems such as high production cost and imposing a limitation regarding a reduction in weight, a reduction in thickness, an increase in area, a reduction in power consumption, a reduction in cost and the like on the display medium.

The application of a liquid crystal/polymer composite film, comprising a liquid crystal present in a polymeric material as a matrix, to a record display medium is expected in order to solve the above problems, and research and development of the above composite film have become increasingly energetic.

A large number of record display media using a liquid crystal/polymer composite film and processes for producing the same have been proposed in the art. One of them is a process for producing a record display medium from an emulsion of a liquid crystal dispersed in an aqueous polyvinyl alcohol (PVA) solution (Japanese Patent Publication No. 52843/1991).

The record display medium prepared from an emulsion of a liquid crystal dispersed in an aqueous PVA solution is unsatisfactory in display characteristics such as contrast, drive voltage, and visibility. Further, since a water-soluble resin is used as the polymeric material for the matrix, the resultant medium has low moisture resistance. Furthermore, since the glass transition temperature (Tg) of the polymeric material is low, the resultant record display medium has a problem that when the temperature of the matrix of the record display medium becomes the glass transition temperature or above, micro motion of the polymer occurs, resulting in deteriorated display characteristics (contrast).

Accordingly, an object of the present invention is to solve the above problems of the prior art and to provide a record display medium using a liquid/polymer composite, which record display medium has excellent contrast, visibility, moisture resistance, and heat resistance and can conduct displaying and recording of information such as in the form of a card or the like.

DISCLOSURE OF INVENTION

The above object can be attained by the present invention. Specifically, according to the present invention, there are provided a polymeric material, for a liquid crystal/polymer composite film comprising a liquid crystal present in a polymer matrix, wherein the polymeric material has a glass transition temperature or a decomposition temperature (if the glass transition temperature is absent) of 150° C. or above and is soluble in an organic solvent and insoluble in water, a liquid crystal/polymer composite film using the material, a record display medium using the composite film, and use of the record display medium.

Use of a particular polymer material as the matrix of the liquid crystal/polymer composite film comprising a liquid crystal present in a matrix can provide a record display medium which has excellent contrast, visibility, moisture resistance, and heat resistance and can conduct displaying and recording of information such as in the form of a card or the like.

BEST MODE FOR CARRYING OUT THE INVENTION

Figure 1:
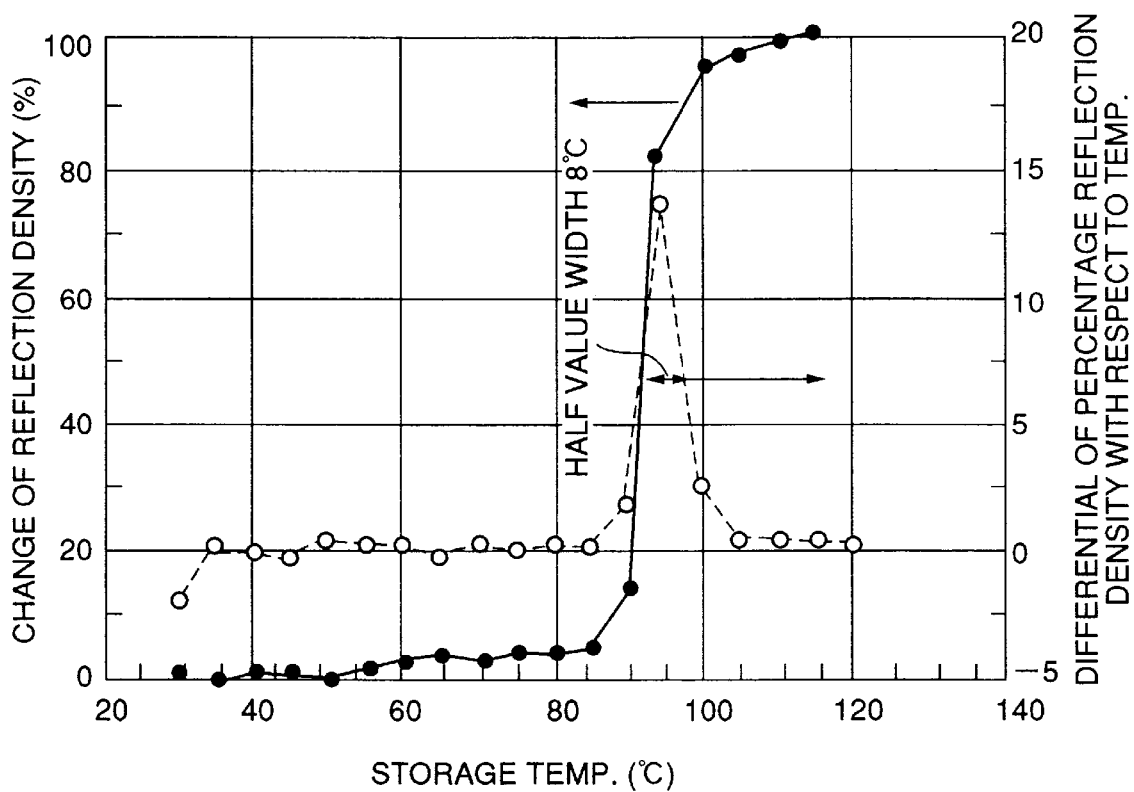
FIGS. 1 to 3 are graphs showing the results of working examples of the present invention.

The present invention will be described in more detail with reference to the following preferred embodiments.

The polymeric material used as a matrix for immobilizing a liquid crystal according to one aspect of the present invention is a polymeric material for a liquid crystal/polymer composite film comprising a liquid crystal present in a polymer matrix, wherein it has a glass transition temperature or decomposition temperature of 150° C. or above and is soluble in an organic solvent and insoluble in water.

The polymeric material used as a matrix for immobilizing a liquid crystal according to another aspect of the present invention has a glass transition temperature or decomposition temperature of 150° C. or above, substantially incompatible with the liquid crystal, causes phase separation from the liquid crystal, and is not substantially dyable with a dichroic dye. When the glass transition temperature or decomposition temperature is 150° C. or above, the polymer causes no micro motion under usual service conditions, offering a stable record display medium.

The polymeric material used as a matrix for immobilizing a liquid crystal according to a further aspect of the present invention is a polymeric material for a liquid crystal/polymer composite film comprising a liquid crystal present in a polymer matrix, wherein, when a value obtained by differentiating a display density value, for a constructed liquid crystal/polymer composite film, with respect to a storage temperature value is defined as a function, the function has a sharp peak, with the difference between the temperature, at which the maximum value is provided, and the phase transition temperature of the liquid crystal used being not more than 20° C., the function having a half value width of not more than 10° C.

The polymeric material is incompatible with the liquid crystal and the dichroic dye and has excellent transparency and film-forming properties. Further, the polymeric material has excellent moisture resistance and heat stability and is less likely to be miscible with the liquid crystal, offering excellent long-term stability. Further, the polymeric material has a glass transition temperature or decomposition temperature of 150° C. or above and is rigid. When the glass transition temperature or decomposition temperature is 150° C. or above, viscoelastic relaxation of a polymer chain segment based on micro-Brown motion is small. That is, in the polymeric material, the main dispersion is small. Even when the micro-Brown motion at the glass transition temperature or below is in a frozen state, one or two mechanical dispersions (secondary dispersions) occur. Use of a polymeric material having small mechanical dispersions as the matrix material is also important. The use of such a polymeric material results in improved heat resistance of the record display medium. Further, when a water-insoluble resin is used, moisture absorption and dissolution of the polymeric material as the matrix does not occur, resulting in improved moisture resistance of the record display medium.

Specific examples of the above polymeric material include those comprising repeating units represented by the following general formula (1):

wherein $R^2$ and $R^4$ represent a hydrogen atom, a methyl group, or $-(CH_2)_n-COOR^5$; $R^3$ represents a hydrogen atom or a methyl group, provided that $R^2$ and $R^4$ are not simultaneously a hydrogen atom; $R^1$ and $R^5$ may be the same or different and represent a hydrocarbon radical which may have a hetero atom and/or a substituent; and n is an integer of 0 to 5.

Derivatives of itaconic acid wherein $R^2=CH^2COOR^5$ and $R^3=R^4=H$ may be mentioned as one example of monomers constituting repeating units in the polymeric material, and specific examples of preferred derivatives of itaconic acid include: diesters of itaconic acid containing a branched alkyl group with 3 to 12 carbon atoms or a substituted alkyl group, with 2 to 6 carbon atoms, containing a substituent of a cyclic structure having 3 to 14 carbon atoms, such as diisopropyl itaconate, di-t-butyl itaconate, dicyclohexyl itaconate, di-sec-butyl itaconate, di-4-methyl-2-pentyl itaconate, isopropyl-t-butyl itaconate, isopropyl-isoamyl itaconate, isopropyl-4-methyl-2-pentyl itaconate, isopropyl-2-ethylhexyl itaconate, isopropyl-nonyl itaconate, t-butyl-sec-butyl itaconate, t-butyl-isoamyl itaconate, t-butyl-4-methyl-2-pentyl itaconate, and t-butyl-2-ethylhexyl itaconate; diesters of itaconic acid having a siloxane hydrocarbon radical, such as methyl(trimethylsilyl) itaconate, ethyl (trimethylsilyl) itaconate, isopropyl(trimethylsilyl) itaconate, cyclohexyl(trimethylsilyl) itaconate, t-butyl (trimethylsilyl) itaconate, isopropyl(3-tris(trimethylsiloxy) silyl)propyl itaconate, and isopropyl-3-(pentamethyl) disiloxanyl)propyl itaconate; diesters of itaconic acid containing a hetero atom, such as N,N-dimethylaminoethyl-isopropyl itaconate, t-butyl-1-butoxy-2-propyl itaconate, 2-cyanoethyl-isopropyl itaconate, glycidyl isopropyl itaconate, diethylphosphonomethyl-isopropyl itaconate, and 2-methylthioethyl-isopropyl itaconate; diesters of itaconic acid substituted by a halogen atom, such as perfluorooctylethyl-isopropyl itaconate, trifluoromethyl-isopropyl itaconate, pentafluoroethyl-isopropyl itaconate, hexafluoroisopropyl-isopropyl itaconate, and bis-1-chloroisopropyl itaconate.

Derivatives of crotonic acid wherein $R^2=R^3=H$ and $R^4=CH_3$ may be mentioned as another example of monomers constituting repeating units in the general formula (1), and specific examples of preferred derivatives of crotonic acid include: esters of crotonic acid containing a branched alkyl or cycloalkyl group with 3 to 12 carbon atoms or a substituted alkyl group, with 2 to 6 carbon atoms, containing a substituent of a cyclic structure having 3 to 14 carbon atoms, such as isopropyl crotonate, t-butyl crotonate, cyclohexyl crotonate, sec-butyl crotonate, 4-methyl-2-pentyl crotonate, isoamyl crotonate, 2-ethylhexyl crotonate, and nonyl crotonate; esters of crotonic acid having a siloxane hydrocarbon radical, such as trimethylsilylcrotonate, 3-tris-(trimethylsiloxy)silylpropyl crotonate, and 3-((pentamethyl) disiloxanyl)propyl crotonate; esters of crotonic acid containing a hetero atom, such as N,N-dimethylaminoethyl crotonate, 1-butoxy-2-isopropyl crotonate, 2-cyanoethyl crotonate, glycidyl crotonate, diethylphosphonomethyl crotonate, and 2-methylthioethyl crotonate; esters of crotonic acid substituted by a halogen atom, such as perfluorooctylethyl crotonate, trifluoromethyl crotonate, pentafluoroethyl crotonate, hexafluoroisopropyl crotonate, and 1-chloroisopropyl crotonate.

Derivatives of metaconic acid wherein $R^2=H$, $R^3=CH_3$ and $R^4=COOR^5$ may be mentioned as a further example of monomers constituting repeating units in the general formula (1), and specific examples of preferred derivatives of metaconic acid include: esters of metaconic acid having a hydrocarbon radical, such as dimethyl metaconate, diethyl metaconate, diisopropyl metaconate, dibutyl metaconate, di-t-butyl metaconate, dipentyl metaconate, dihexyl metaconate, diheptyl metaconate, dioctyl metaconate, di-2-ethylhexyl metaconate, dinonyl metaconate, didecyl metaconate, diundecyl metaconate, didodecyl metaconate, ditridecyl metaconate, diisotridecyl metaconate, dicyclohexyl metaconate, di-4-methyl-2-pentyl metaconate, isopropyl-t-butyl metaconate, isopropyl-isoamyl metaconate, isopropyl-4-methyl-2-pentyl metaconate, isopropyl-2-ethylhexyl metaconate, isopropyl-nonyl metaconate, t-butyl-sec-butyl metaconate, t-butyl-isoamyl metaconate, t-butyl-4-methyl-2-pentyl metaconate, t-butyl-2-ethylhexyl metaconate, diphenyl metaconate, and ditoluyl metaconate; diesters of metaconic acid having a silicon atom, such as methyl-(trimethylsilyl) metaconate, ethyl-(trimethylsilyl) metaconate, isopropyl-(trimethylsilyl) metaconate, cyclohexyl-(trimethylsilyl) metaconate, t-butyl-(trimethylsilyl) metaconate, isopropyl-(3-tris (trimethylsiloxy)silyl)propyl metaconate, and isopropyl-3-( (pentamethyl)disiloxanyl)propyl metaconate; hetero atom-substituted diesters of metaconic acid, such as N,N-dimethylaminoethyl-isopropyl metaconate, t-butyl-1-butoxy-2-propyl metaconate, 2-cyanoethyl-isopropyl metaconate, glycidyl-isopropyl metaconate, diethylphosphomethyl-isopropyl metaconate, and 2-methylthioethyl-isopropyl metaconate; diesters of metaconic acid having a halogen atom, such as perfluorooctylethyl-isopropyl metaconate, trifluoromethyl-isopropyl metaconate, pentafluoroethyl-isopropyl metaconate, hexafluoroisopropyl-isopropyl metaconate, and bis-1-chloroisopropyl metaconate.

Specific examples of additional preferred monomers constituting repeating units in the general formula (1) include those comprising repeating units represented by the following general formula (2):

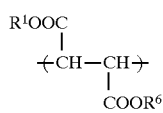

(2)

In the general formula (2), $R^1$ and $R^6$ may be the same or different and represent a hydrocarbon radical optionally having a hetero atom and/or a substituent, and specific examples thereof include alkyl, alkenyl, aryl, cycloalkyl, and cycloalkenyl groups. These groups may contain a silicon, nitrogen, oxygen, sulfur, or phosphorus atom as a hetero atom and a halogen atom or the like as a substituent.

Specific examples of diesters of fumaric acid represented by the general formula (2) include: esters of fumaric acid having a hydrocarbon radical, such as dimethyl fumarate, diethyl fumarate, diisopropyl fumarate, dibutyl fumarate, di-t-butyl fumarate, dipentyl fumarate, dihexyl fumarate, diheptyl fumarate, dioctyl fumarate, di-2-ethylhexyl fumarate, dinonyl fumarate, didecyl fumarate, diundecyl fumarate, didodecyl fumarate, ditridecyl fumarate, diisotridecyl fumarate, dicyclohexyl fumarate, di-4-methyl-2-pentyl fumarate, isopropyl-t-butyl fumarate, isopropyl-isoamyl fumarate, isopropyl-4- methyl-2-pentyl fumarate, isopropyl-2-ethylhexyl fumarate, isopropyl-nonyl fumarate, t-butyl-sec-butyl fumarate, t-butyl-isoamyl fumarate, t-butyl-4-methyl-2-pentyl fumarate, t-butyl-2-ethylhexyl fumarate, diphenyl fumarate, and ditoluyl fumarate; diesters of fumaric acid having a silicon atom, such as methyl-(trimethylsilyl) fumarate, ethyl-(trimethylsilyl) fumarate, isopropyl-(trimethylsilyl) fumarate, cyclohexyl-(trimethylsilyl) fumarate, t-butyl-(trimethylsilyl) fumarate, isopropyl-(3-tris(trimethylsiloxy)silyl)propyl fumarate, and isopropyl-3-((pentamethyl)disiloxanyl)propyl fumarate; hetero atom-substituted diesters of fumaric acid, such as N,N-dimethylaminoethyl-isopropyl fumarate, t-butyl-1-butoxy-2-propyl fumarate, 2-cyanoethyl-isopropyl fumarate, glycidyl-isopropyl fumarate, diethylphosphomethyl-isopropyl fumarate, and 2-methylthioethyl-isopropyl fumarate; diesters of fumaric acid having a halogen atom, such as perfluorooctylethyl-isopropyl fumarate, trifluoromethyl-isopropyl fumarate, pentafluoroethyl-isopropyl fumarate, hexafluoroisopropyl-isopropyl fumarate, and bis-1-chloroisopropyl fumarate.

Presence of repeating units represented by the general formula (1) or (2) suffices for the polymer comprising repeating units represented by the general formula (1) or (2). Further, the following additional repeating units may be incorporated by copolymerization at the time of the production of the polymer.

Additional repeating units usable herein include half esters of fumaric acid of the types described above; polymerizable organic acids, such as (meth)acrylic acid, itaconic acid, citraconic acid, and maleic acid; esters of (meth)acrylic acid, such as methyl (meth)acrylate, ethyl (meth)acrylate, isopropyl (meth)acrylate, butyl (meth)acrylate, hexyl (meth) acrylate, octyl (meth)acrylate, 2-ethylhexyl (meth)acrylate, and cyclohexyl (meth)acrylate; nitrogen-containing acrylic compounds, such as amide (meth)acrylate, N,N-dimethylamide (meth)acrylate, and N,N-dimethylaminoethyl (meth)acrylate; vinyl ethers, such as methyl vinyl ether, ethyl vinyl ether, and isobutyl vinyl ether; vinyl esters, such as vinyl acetate and vinyl pivalate; allyl esters, such as allyl acetate and allyl benzoate; maleimides; and α-olefins, such as styrene, vinyl toluene, vinyl pyridine, vinyl chloride, vinylidene chloride, ethylene, and propylene.

Polymeric materials usable as the matrix in the present invention may be used alone or as a mixture of two or more.

The content of the repeating units represented by the general formula (1) or (2) in the polymeric material is not particularly limited. It is preferably not less than 50% by mole from the viewpoint of developing good display characteristics in the record display medium. Other thermoplastic resin(s) may be incorporated into the polymeric material according to the present invention. The incorporation of other resin(s) results in further improved adhesion of the substrate and the protective layer to the liquid crystal/polymer composite film. Preferred thermoplastic resins include a vinyl chloride/vinyl acetate copolymer, a polyester resin, a polyurethane resin, a polystyrene resin, and an acrylic resin. A plurality of thermoplastic resins may be incorporated into the polymer in order to further improve the adhesion. The amount of the above thermoplastic resin, if used, is 0 to 1,000 parts by weight, preferably 200 to 500 parts by weight, more preferably 300 to 400 parts by weight, based on 100 parts by weight of the polymeric material.

The polymeric materials used in the matrix in the present invention may be produced by any conventional method without a particular limitation. For example, they may be prepared by polymerizing a monomer to be served as repeating units represented by the general formula (1) or (2) and, if necessary, other monomer(s) in the presence of a radical polymerization initiator at 0° to 150° C. for 1 to 100 hr. Polymerization initiators usable herein include benzoyl peroxide, diisopropyl peroxycarbonate, t-butyl peroxy-2-ethylhexanoate, t-butyl peroxypivalate, t-butyl peroxydiisobutyrate, lauroyl peroxide, and azobisisobutyronitrile.

The polymeric materials comprising repeating units represented by the general formula (1) or (2) have a high glass transition temperature, and, in addition, when a very bulky substituent is introduced into the backbone, the secondary dispersion can be reduced. Further, despite the high glass transition temperature, the polymeric materials can be readily dissolved in a general-purpose solvent, such as toluene or methyl ethyl ketone, to prepare a homogeneous preparation, enabling the preparation of a homogeneous solution of the liquid crystal and the polymeric material. Furthermore, for the polymeric materials, since the carbon—carbon bond in the backbone cannot be easily rotated due to the presence of a bulky substituent bonded to the backbone, the polymeric materials are rigid. Therefore, they have low compatibility with the liquid crystal and is less likely to be dyed with a dichroic dye, enabling the preparation of record display media having a high contrast.

The polymer matrix used in the record display medium according to the present invention comprises a polymer comprising repeating units represented by the following formula (A) and has an average molecular weight of 200,000 to 800,000:

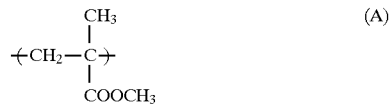

(A)

An average molecular weight of less than 200,000 is unsatisfactory, e.g., because of low film strength of the liquid crystal/polymer film. An average molecular weight exceeding 800,000 is also unsatisfactory, e.g., because the solubility of the polymer matrix in the solvent is low, making it difficult to prepare a coating solution for the composite film. The average molecular weight is preferably in the range of from 300,000 to 550,000.

The above polymer may be a homopolymer consisting of repeating units represented by the formula (A).

Alternatively, it may be a copolymer comprising the repeating units represented by the formula (A) and up to 10% by mole, preferably 1 to 10% by mole of other copolymerizable monomer(s). Copolymerizable monomers usable herein include, for example, styrene, vinyl chloride, vinyl acetate, and acrylonitrile. Among them, styrene is preferred, e.g., because the resultant copolymer resin has a high glass transition temperature.

The homopolymer or the copolymer may be used alone as the polymer. Alternatively, it may be used in the form of a polymer blend with up to 10% by weight, preferably 1 to 10% by weight of other polymer(s). Other polymers which may be blended with the above polymer include, for example, polystyrene, polyvinyl chloride, polyvinyl acetate, polyester, and polyacrylonitrile. Among them, polystyrene is preferred, e.g., because the polymer blend has a high glass transition temperature.

The above polymer matrix may be easily produced by a conventional polymerization method and, in addition, may be commercially available, for example, from Soken Chemical Engineering Co., Ltd. under the trade designation "PMMA M1002B."

According to a preferred embodiment of the present invention, the polymer matrix contains at least one plasticizer in an amount up to 15% by weight, preferably in the range of from 0.01 to 15.0% by weight, based on the polymer matrix. Plasticizers usable herein include phthalic ester plasticizers, such as di-n-octyl phthalate, di-(2-ethylhexyl) phthalate, dinonyl phthalate, diisodecyl phthalate, and ditridecyl phthalate, and other conventional plasticizers, such as esters of dibasic esters, glycol esters, fatty esters, epoxy plasticizers and phosphoric esters. Use of these plasticizers results in enhanced processability of the polymer matrix and, at the same time, offers advantages such as increased flexibility, elasticity, and deflectability of the composite film.

The polymeric material of the present invention, even when any liquid crystal (nematic, smectic, or cholesteric) is present therein, is less likely to be dyed with the liquid crystal or the dichroic dye and, hence, can offer a high contrast in the form of a record display medium. Examples of smectic liquid crystals which may be preferably used in the present invention include sodium myristate, sodium palmitate, sodium benzoate, ethyl p-azoxybenzoate, p-decyloxybenzylidene-p'-amino-2-methylbutyl cinnamate, p-hexyloxybenzylidene-p'-amino-2-chloropropyl cinnamate, and mixtures thereof.

Liquid crystals which, when used with the polymeric material of the present invention, can offer high contrast and heat resistance include a smectic liquid crystal composition comprising: at least one member selected from compounds represented by the following general formula (I)

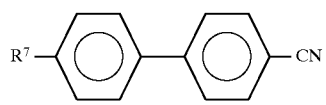 (I)

wherein $R^7$ represents an alkyl or alkoxy group having 8 to 18 carbon atoms; and at least one member selected from compounds represented by the following general formulae (II) to (VII)

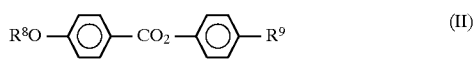 (II)

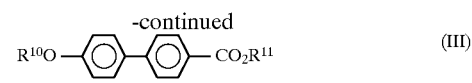 (III)

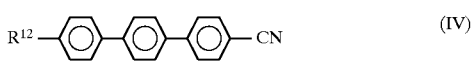 (IV)

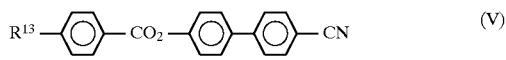 (V)

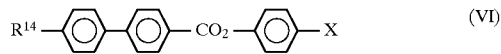 (VI)

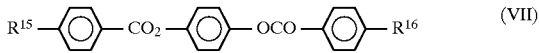 (VII)

wherein $R^8$, $R^{10}$, $R^{11}$, and $R^{12}$ represent an alkyl group having 2 to 18 carbon atoms, $R^9$, $R^{13}$, $R^{14}$, $R^{15}$, and $R^{16}$ represent an alkyl or alkoxy group having 2 to 18 carbon atoms, and X represents a halogen atom or an alkyl or alkoxy group having 2 to 18 carbon atoms.

Among these liquid crystals, 4-alkyl-4'-cyanobiphenyl or 4-alkoxy-4'-cyanobiphenyl, having 8 to 18 carbon atoms, represented by the general formula (I) exhibits a stable smectic liquid crystal phase around room temperature and, in the form of a liquid crystal/polymer composite film type record display medium, provides a good contrast. Any one of these compounds may be used. In order to provide a stable smectic liquid crystal phase in a wider temperature range, at least two of these compounds may be properly selected and used in combination.

4-Alkyl-4'-cyanobiphenyl or 4-alkoxy-4'-cyanobiphenyl compounds, having 7 or less carbon atoms, when used alone, do not exhibit a smectic liquid crystal phase. However, the addition of the above compound having 8 to 18 carbon atoms to these compounds enables adjustment to be made to a temperature region where a smectic liquid crystal phase is exhibited. Further, it can provide a more stable smectic liquid crystal phase. In this case, preferably, the 4-alkyl or 4-alkoxy-4'-cyanobiphenyl compound having 8 to 18 carbon atoms is added in an amount of at least 40% by weight to all the 4-alkyl or 4-alkoxy-4'-cyanobiphenyl compounds from the viewpoint of providing a stable smectic liquid crystal phase.

The above compounds are known in the art (for example, Kusabayashi, "EKISHOU ZAIRYO," p. 229, published by Kodansha Ltd. (1991)), and, for example, 4-alkyl-4'-bromovinylphenyl or 4-alkoxy-4'-bromobiphenyl can be reacted with copper cyanide to give a corresponding 4-alkyl-4'-cyanobiphenyl or 4-alkoxy-4'-cyanobiphenyl. Some of these compounds are commercially available.

However, mere use of a compound, having a high smectic liquid crystal phase to nematic liquid crystal phase transition temperature or a smectic liquid crystal phase to isotropic phase transition temperature, as the compound represented by the general formula (I), gives rise to an increase in melting point and, when the record display medium is allowed to stand at a low temperature, causes the alignment of the liquid crystal to be disturbed, resulting in a lowering of contrast or disappearance of display in the record display area.

For this reason, the present inventors have made studies with a view to increasing the phase transition temperature between the smectic liquid crystal phase and the nematic liquid crystal phase or between the smectic liquid crystal phase and the isotropic phase while keeping the melting temperature low and, as a result, have found that the addition of at least one of the compounds represented by the general formulae (II) to (VII) to the compound represented by the general formula (I) can realize this.

The 4-alkylphenyl 4-alkoxybenzoate ester compounds or 4-alkoxyphenyl 4-alkoxybenzoate ester compounds represented by the general formula (II) are known in the art (for example, Fluessige Kristalle in Tabellen, VED Deutscher Verlag fuer Grundstoffindustrie Leipzig, pp. 63–69, 1976) and can be prepared, for example, by esterifying a 4-alkylphenol with a 4-alkoxy benzoate using a dicyclohexylcarbodiimide or the like as a dehydrating agent, and some of these compounds are commercially available.

The 4-alkoxybiphenyl-4'-carboxylic acid alkyl ester compounds represented by the general formula (III) are known in the art [for example, Mol. Cryst. Liq. Cryst., 37, pp. 157–188 (1976)] and can be simply prepared, for example, by esterifying an alkanol with a 4-alkoxybiphenyl-4'-carboxylic acid in the presence of an acid catalyst such as sulfuric acid.

The 4-alkyl-4"-cyano-p-terphenyl compounds represented by the general formula (IV) are known in the art [for example, Mol. Cryst. Liq. Cryst., 38, pp. 345–352 (1977)] and can be prepared, for example, by treating a 4-alkyl-p-terphenyl-4"-carboxylic acid chloride with aqueous ammonia to give a 4-alkyl-p-terphenyl-4"-carboxylic acid amide which is then reacted with phosphorus pentoxide. Some of these compounds are commercially available.

The 4'-cyanobiphenyl 4-alkylbenzoate ester or 4'-cyanobiphenyl 4-alkoxybenzoate ester compounds represented by the general formula (V) are known in the art (for example, Fluessige Kristalle in Tabllen II, VED Deutscher Verlag fuer Grundstoffindustrie Leipzig, pp. 287–288, 1984) and can be prepared, for example, by esterifying a 4-alkylbenzoic acid or a 4-alkoxybenzoic acid with 4-cyano-4'-hydroxybiphenyl using a dicyclohexylcarbodiimide or the like as a dehydrating agent.

Among the compounds represented by the general formula (VI), most of the 4-alkoxybiphenyl-4'-carboxylic acid 4-halophenyl ester compounds, 4-alkoxybiphenyl-4'-carboxylic acid 4-alkylphenyl ester compounds, 4-alkoxybiphenyl-4'-carboxylic acid 4-alkoxyphenyl ester compounds, 4-alkylbiphenyl-4'-carboxylic acid 4-halophenyl ester compounds, 4-alkylbiphenyl-4'-carboxylic acid 4-alkylphenyl ester compounds, and 4-alkylbiphenyl-4'-carboxylic acid 4-alkoxyphenyl ester compounds are known in the art (for example, Fluessige Kristalle in Tabllen II, VED Deutscher Verlag fuer Grundstoffindustrie Leipzig, pp. 295–300, 1984) and can be prepared, for example, by esterifying a 4-alkoxybiphenyl-4'-carboxylic acid or a 4-alkylbiphenyl-4'-carboxylic acid with a 4-halophenol or a 4-alkylphenol using a dicyclohexylcarbodiimide or the like as a dehydrating agent. The halogen element in these compounds may be of any kind. However, fluorine or chlorine is preferred from the viewpoint of chemical stability.

The p-phenylene di-4-alkylbenzoate ester compounds, p-phenylene di-4-alkoxybenzoate ester compounds, and p-phenylene 4-alkylbenzoic acid-4-alkoxybenzoate ester compounds represented by the general formula (VII) are known in the art [for example, J. Org. Chem., 37 (9), p. 1425 (1972)] and can be prepared, for example, by reacting a p-alkylbenzoyl chloride or a p-alkoxybenzoyl chloride with hydroquinone under basic conditions and then reacting the reaction product with a p-alkylbenzoyl chloride or a p-alkoxybenzoyl chloride under basic conditions.

The compounds represented by the general formulae (II) to (VII) serve to increase the smectic-nematic phase transition temperature or the smectic-isotropic phase transition temperature. The storage stability of records at high temperatures becomes better with increasing the phase transition temperature, and the phase transition temperature is preferably 60° C. or above, particularly preferably 60° to 130° C.

However, when the phase transition temperature is excessively high, the state of alignment of liquid crystal molecules is less likely to be changed upon application of heat or an electric field. Therefore, a high phase transition temperature can enhance the storage stability of records in the record display medium in a high temperature region but requires high thermal energy or strong electric field for printing or erasing of information by application of heat or an electric field. For this reason, what is most important here is that records can be stored in the temperature range of from around −40° to 100° C., i.e., under usual service conditions of the record display medium.

At least one compound or two or more compounds in combination which are properly selected from the above compound species so as to meet the above requirement may be used. Among the compounds represented by the general formulae (II) to (VII), those wherein the alkyl or alkoxyl group has 2 to 18 carbon atoms are easily available. They have a phase transition temperature suitable for practical use and, in addition, are excellent in stability of the liquid crystalline phase.

The compounds represented by the general formulae (II) to (VII) are incorporated in an amount of preferably 10 to 300 parts by weight, particularly preferably 20 to 240 parts by weight, based on 100 parts by weight of the compound represented by the general formula (I).

Incorporation of 1 to 220 parts by weight, preferably 5 to 100 parts by weight, of at least one compound selected from the compounds represented by the general formulae (IV) to (VII) into 100 parts by weight of a mixture of the compound represented by the general formula (I) and the compound represented by the general formula (II) in a weight ratio of preferably 80:20 to 30:70, particularly preferably 60:40 to 40:60 is preferred because it can provide a liquid crystal composition which has a high contrast and causes neither a lowering of contrast nor disappearance of display in a high temperature region as well as in a considerably low temperature region, for example, at −40° C.

Other liquid crystalline compounds or additives may be added to the liquid crystal composition so far as they do not destroy the smectic liquid crystalline phase. In particular, the incorporation of a dichroic dye in an amount of 1 to 10 parts by weight based on 100 parts by weight of the liquid crystal composition is favorable for improving the contrast ratio or coloring or other purposes.

According to a preferred embodiment of the present invention, a black dichroic dye comprising a mixture of azo dichroic dyes is added to the above liquid crystal compositions, particularly preferably the liquid crystal composition recited in claim 26, to improve the contrast ratio of a display image. The amount of the dichroic dye added may be, for example, 1 to 10 parts by weight, preferably 1 to 3 parts by weight, based on 100 parts by weight of the liquid crystal composition.

Examples of dichroic dyes useful in the present invention are as follows.

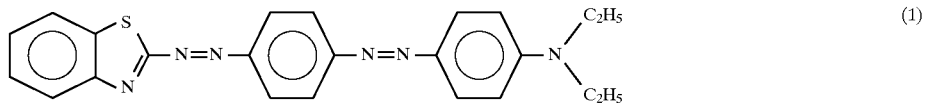 (1)
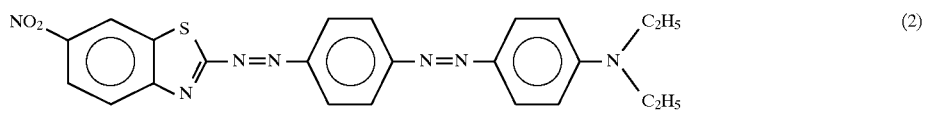 (2)
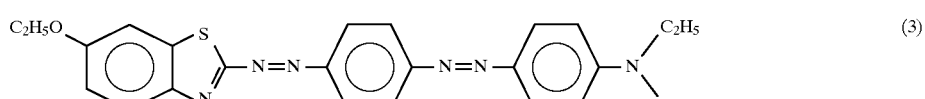 (3)
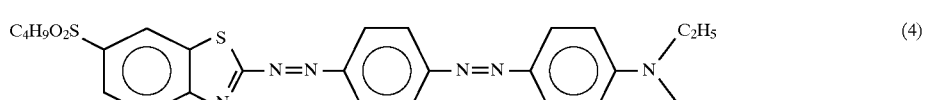 (4)
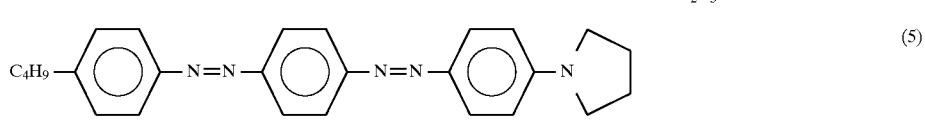 (5)
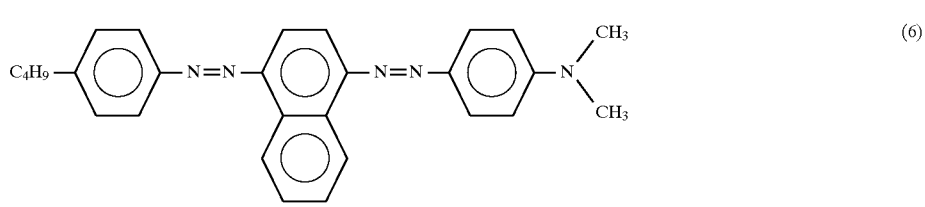 (6)
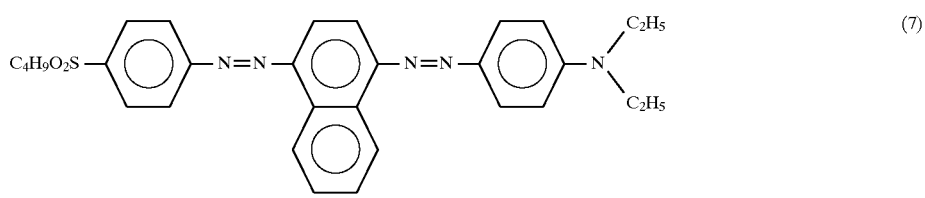 (7)
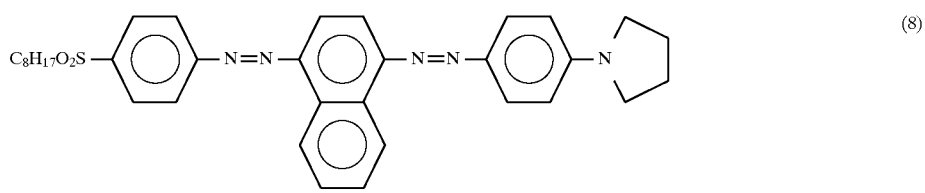 (8)
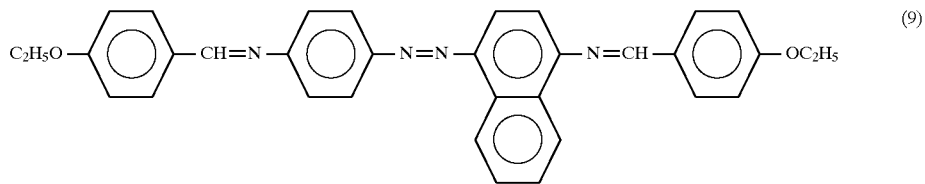 (9)
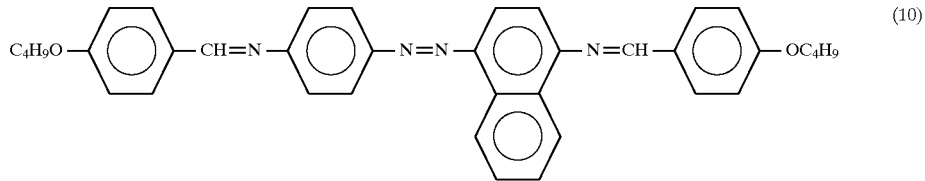 (10)
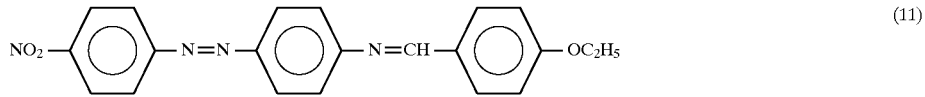 (11)

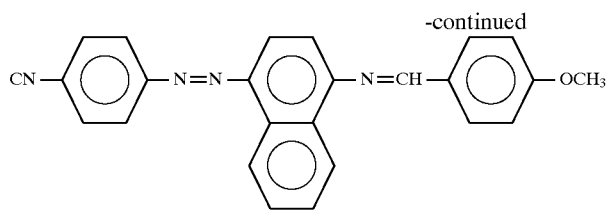
(12)
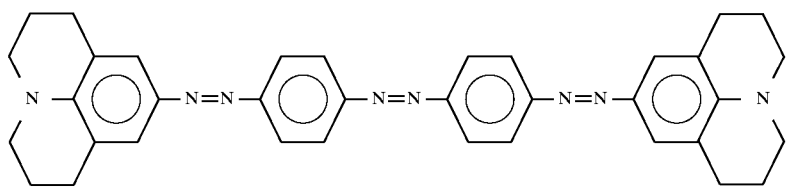
(13)
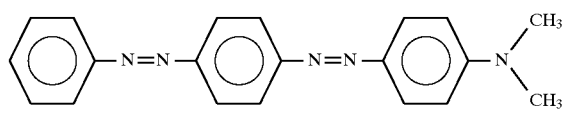
(14)
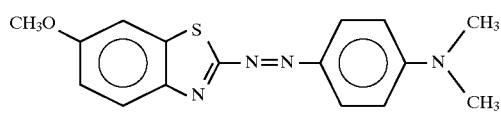
(15)
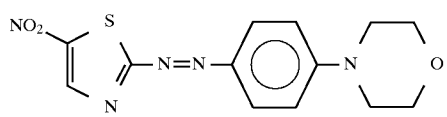
(16)
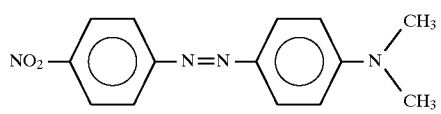
(17)
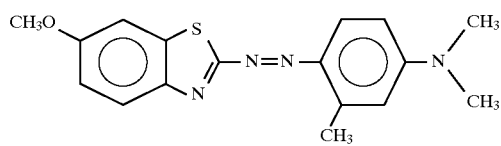
(18)
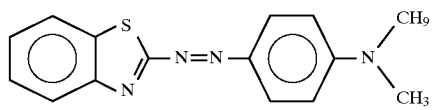
(19)
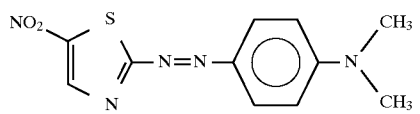
(20)
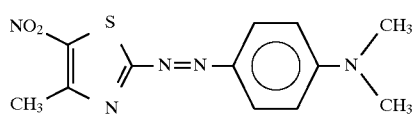
(21)
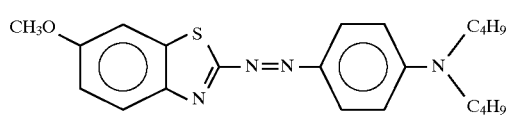
(22)
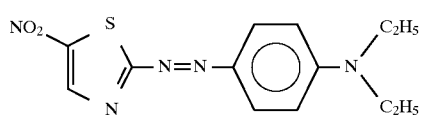
(23)

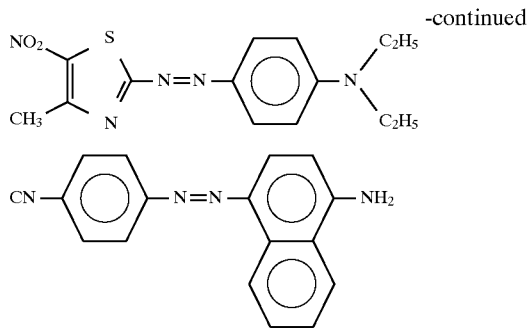

All the above azo dichroic dyes are known in the art. In the present invention, two or more dichroic dyes are selected from the above azo dichroic dyes and mixed together to prepare a black mixture. Preferred is a mixture having a composition which, when used as the record display medium of the present invention, provides a difference in lightness between a written area and an erased area, $|\Delta L^*|$, in the range of from 5 to 25 or a mixture having a composition which, when used as the record display medium of the present invention, provides a difference in chroma between a written area and an erased area, $|\Delta C^*|$, in the range of from 0 to 10.

The polymeric material and the liquid crystal composition can be used to form a liquid crystal/polymer composite film comprising a liquid crystal composition present in a matrix on a conductive substrate, thereby preparing the rewritable record display medium of the present invention. Specific preferred embodiments for the preparation of the liquid crystal/polymer composite film and the record display medium will be described. However, the present invention is not limited to these embodiments only.

The amounts of the liquid crystal and the polymeric material used are not particularly limited. However, the mixing ratio (weight ratio) of the liquid crystal to the polymeric material is preferably 5:95 to 80:20, more preferably 35:65 to 45:55. When the amount of the liquid crystal used is excessively small, the transparency is unsatisfactory when an electric field is applied and, at the same time, a very high electric field is necessary for bringing the film to a transparent state. On the other hand, the use of an excessively large amount of the liquid crystal results in unsatisfactory scattering (turbidity) when heat is applied. Further, in this case, the strength of the film is deteriorated.

The liquid crystal may be dispersed in the matrix comprising a polymeric material by any conventional method such as an emulsion or phase separation method with the phase separation method being useful. In the phase separation method, the polymeric material and the liquid crystal are dissolved in a common solvent, and the common solvent is evaporated from the mixed solution by solvent casting, development on a water surface or the like to form a film having a suitable thickness. According to the phase separation method, a liquid crystal/polymer composite film comprising a liquid crystal present in the formed film is formed.

The formation of a liquid crystal/polymer composite film and a record display medium using a mixed solution containing the above smectic liquid crystal and the polymeric material can be carried out, for example, by coating the mixed solution on the surface of one conductive substrate for constructing the record display medium by suitable means, such as screen printing, stencil printing using a metallic mask, brush coating, spray coating, blade coating, doctor coating, or roll coating, drying the coating to form a liquid crystal/polymer composite film and optionally providing a protective layer to form the record display medium of the present invention.

After the formation of the liquid crystal/polymer composite film on the conductive substrate by the above method, the other conductive substrate may be laminated onto the surface of the composite film.

The conductive substrate used in the record display medium may be any conductive substrate commonly used in conventional liquid crystal display devices, and specific examples thereof include electrode substrates wherein a transparent conductive material, such as an ITO, $SnO_2$-based, or ZnO-based material, is deposited onto a transparent substrate such as glass or a polymer film. In this case, when an opaque conductive substrate is used, a substrate with a reflective electrode of aluminum provided thereon is preferred because the opaque substrate is required to serve also as a reflector. The substrate per se may be made of glass, a polymer film or other material. A reflector of glass or a polymer film with $Al_2O_3$, $TiO_2$, ZnO or the like deposited thereon may be laminated onto the surface of the transparent conductive substrate remote from the liquid crystal/polymer composite film.

In general, the thickness of the liquid crystal/polymer composite film provided between a pair of substrates or between the conductive substrate and the protective layer is preferably about 3 to 23 $\mu$m. When the film thickness is less than the above range, problems arise such as lowered display contrast. On the other hand, when the film thickness exceeds the above ranges, problems arise such as increased voltage (drive voltage).

According to one preferred embodiment of the present invention, there is provided a record display medium comprising a liquid crystal/polymer composite film provided between a pair of conductive substrates with at least one of the substrates being transparent, the liquid crystal/polymer composite film comprising a liquid crystal composition present in a polymeric material.

According to another preferred embodiment of the present invention, there is provided an information display medium comprising the above liquid/polymer composite film provided on a conductive substrate and a protective layer, provided on the liquid crystal/polymer composite film, optionally through an intermediate layer.

The intermediate layer may be formed of the same resin as used in the polymeric material. Such an intermediate layer and a protective layer formed of a thermosetting resin, an ultraviolet-curing resin, or an electron beam-curing resin, for example, a polyene-thiol, a polymerizable acrylate polymer, having in its molecule a (meth)acryloyl group, such as urethane acrylate, epoxy acrylate, or silicone acrylate, or a known curing resin comprising a monofunctional or polyfunctional monomer such as methyl methacrylate, are provided to form a rewritable record display medium.

This embodiment will be described by taking an information rewritable card as an example.

In the case of an information rewritable card, only one electrode is used. The substrate for the electrode is particularly preferably a polymer film. A white polyethylene terephthalate (PET) film is desired. A metal, such as aluminum, besides a transparent conductive material, such as ITO, may be used for the conductive layer. Further, a protective film is provided on the liquid/polymer composite film to protect the composite film. Although the material for the protective film is not particularly limited, a curing resin having mechanical strength, water resistance or other properties is preferred.

For example, UV- or electron beam-curing poly(meth)acrylate or polyurethane (meth)acrylate is used. When the above protective film cannot be formed directly on the liquid crystal/polymer composite film, a thin film of a water-soluble polymer, such as polyvinyl alcohol, may be formed as an intermediate layer between the composite film and the protective film. Alternatively, the above protective film material formed on a separate sheet may be transferred or laminated and then cured to form a protective layer.

In the case of an information rewritable card, the suitable range of the ratio of the liquid crystal to the polymer is different from that in the case of the display, and the weight ratio of the liquid crystal to the polymer is preferably 20:80 to 55:45. Further, the incorporation of a dichroic dye into the liquid crystal is preferred from the viewpoint of increasing the contrast of display.

For the record display media (including cards) having the above constructions, recording and erasing of information will be described.

In the record display medium using the liquid crystal/polymer composite film of the present invention, the application of an electric filed causes the liquid crystal to be aligned, rendering the liquid crystal/polymer composite film transparent. On the other hand, heating causes the alignment of the liquid crystal to be disturbed, bringing the liquid crystal/polymer composite film to the state of scatter and absorption. For example, writing of information may be performed by bringing the liquid crystal/polymer composite film to a transparent state, by applying an electric field, and then bringing the transparent film to the state of scatter and absorption by heating to write necessary information. In this case, the written information may be erased by applying an electric field to the whole area or heating the whole area.

Conversely, writing of information may be performed by bringing the whole area of the liquid crystal/polymer composite film to the state of scatter and absorption and then applying an electric field to write necessary information. In this case, the written information may be erased by heating the whole area of the film or applying an electric filed to the whole area of the film. In particular, when writing and erasing are repeatedly conducted, it is preferred to use a method wherein information is written by applying one of an electric field or heat and erased by applying the remainder. Corona discharge is particularly useful for applying the electric field. In the case of the application of an electric field, satisfactory alignment of liquid crystal molecules in a short time can be expected by heating the liquid crystal/polymer composite film. Therefore, heating is preferably conducted according to need.

The present invention will be described in more detail with reference to the following examples and comparative examples.

Preparation of liquid crystal compositions

Liquid crystal compounds listed in Table 1 were provided and mixed in various combinations as specified in Table 2 to prepare liquid crystal compositions.

TABLE 1

Compounds of general formula (I)

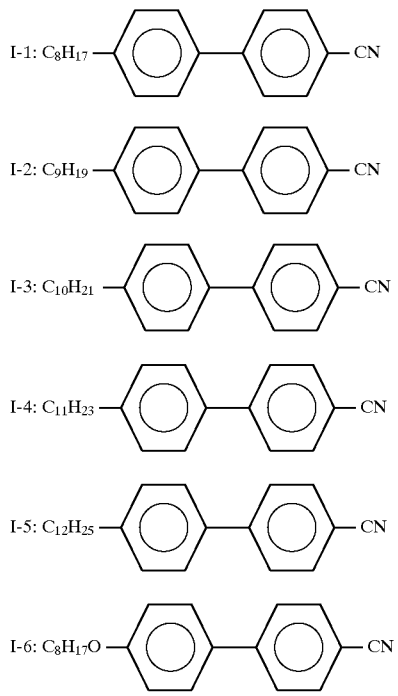

I-1: $C_8H_{17}$ —⟨○⟩—⟨○⟩— CN

I-2: $C_9H_{19}$ —⟨○⟩—⟨○⟩— CN

I-3: $C_{10}H_{21}$ —⟨○⟩—⟨○⟩— CN

I-4: $C_{11}H_{23}$ —⟨○⟩—⟨○⟩— CN

I-5: $C_{12}H_{25}$ —⟨○⟩—⟨○⟩— CN

I-6: $C_8H_{17}O$ —⟨○⟩—⟨○⟩— CN

TABLE 1-continued
I-7: $C_9H_{19}O$— 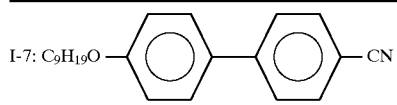 —CN
I-8: $C_{10}H_{21}O$— 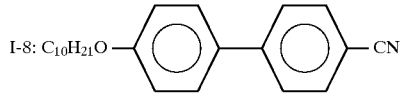 —CN
I-9: $C_{12}H_{25}O$— 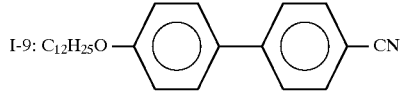 —CN
Compounds of general formula (II)
II-1: $C_6H_{13}O$— 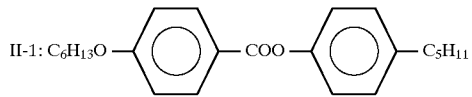 —$C_5H_{11}$
II-2: $C_8H_{17}O$— 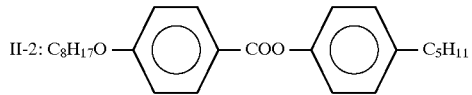 —$C_5H_{11}$
II-3: $C_8H_{17}O$— 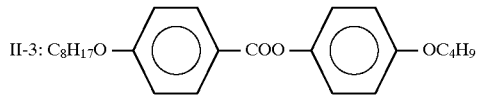 —$OC_4H_9$
II-4: $C_8H_{17}O$— 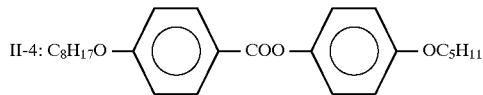 —$OC_5H_{11}$
II-5: $C_8H_{17}O$— 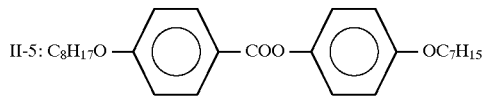 —$OC_7H_{15}$
II-6: $C_8H_{17}O$— 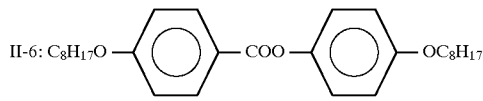 —$OC_8H_{17}$
II-7: $C_8H_{17}O$— 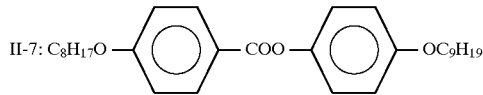 —$OC_9H_{19}$
II-8: $C_9H_{19}O$— 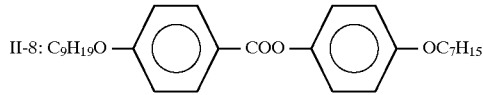 —$OC_7H_{15}$
II-9: $C_{10}H_{21}O$— 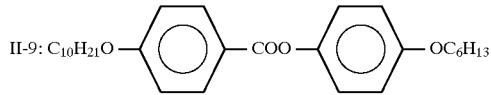 —$OC_6H_{13}$
II-10: $C_{12}H_{25}O$— 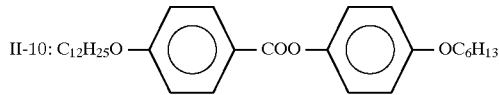 —$OC_6H_{13}$
Compounds of general formula (III)
III-1: $C_8H_{17}O$— 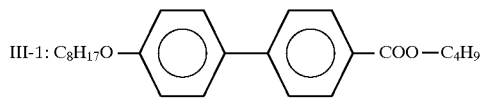 —$COO-C_4H_9$

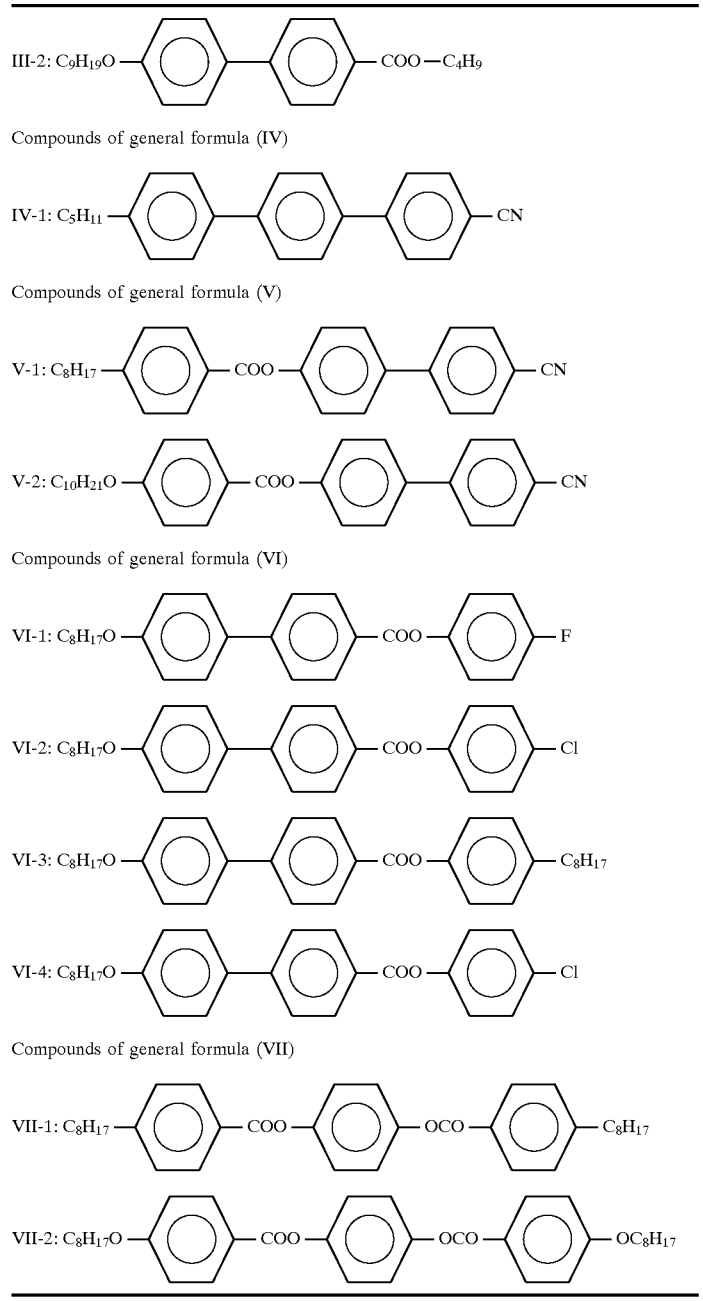
| TABLE 2 | | | | | | | | | | | | | | | |
|---|---|---|---|---|---|---|---|---|---|---|---|---|---|---|---|
| Composition A (wt %) | | Composition B (wt %) | | Composition C (wt %) | | Composition D (wt %) | | Composition E (wt %) | | Composition F (wt %) | | Composition G (wt %) | | Composition H (wt %) | |
| I-2 | 33.3 | I-3 | 17.2 | I-2 | 48.0 | I-2 | 26.8 | I-2 | 23.4 | I-3 | 18.2 | I-3 | 16.2 | I-3 | 14.2 |
| I-7 | 16.7 | I-5 | 17.2 | I-7 | 24.0 | I-7 | 13.2 | I-7 | 11.6 | I-5 | 18.2 | I-5 | 16.2 | I-5 | 14.2 |
| II-1 | 20.0 | I-8 | 4.3 | I-8 | 8.0 | II-1 | 16.0 | II-1 | 14.0 | I-8 | 4.5 | I-8 | 4.0 | I-8 | 3.5 |
| II-2 | 30.0 | I-9 | 3.8 | IV-1 | 20.0 | II-2 | 24.0 | II-2 | 21.0 | I-9 | 4.1 | I-9 | 3.6 | I-9 | 3.1 |
| | | II-1 | 17.0 | V-1 | 20.0 | | | V-1 | 30.0 | II-1 | 18.0 | II-1 | 16.0 | II-1 | 14.0 |
| | | II-2 | 25.5 | | | | | | | II-2 | 27.0 | II-2 | 24.0 | II-2 | 21.0 |
| | | III-2 | 15.0 | | | | | | | IV-1 | 10.0 | V-1 | 20.0 | IV-1 | 30.0 |

TABLE 2-continued

| Composition I (wt %) | | Composition J (wt %) | | Composition K (wt %) | | Composition L (wt %) | |
|---|---|---|---|---|---|---|---|
| I-1 | 23.5 | I-1 | 23.5 | I-3 | 18.2 | I-3 | 18.2 |
| I-2 | 15.7 | I-2 | 15.7 | I-5 | 18.2 | I-5 | 18.2 |
| I-6 | 16.8 | I-6 | 16.8 | I-8 | 4.5 | I-8 | 4.5 |
| III-1 | 15.0 | III-1 | 15.0 | I-9 | 4.1 | I-9 | 4.1 |
| III-2 | 4.0 | III-2 | 4.0 | II-1 | 18.0 | II-1 | 18.0 |
| IV-1 | 25.0 | V-1 | 15.0 | II-2 | 27.0 | II-2 | 27.0 |
| | | V-2 | 10.0 | VI-1 | 10.0 | VI-2 | 10.0 |

| Composition M (wt %) | | Composition N (wt %) | | Composition O (wt %) | | Composition P (wt %) | |
|---|---|---|---|---|---|---|---|
| I-3 | 17.2 | I-5 | 17.2 | I-5 | 18.2 | I-5 | 20.3 |
| I-5 | 17.2 | I-3 | 17.2 | I-3 | 18.2 | I-3 | 20.2 |
| I-8 | 4.3 | I-9 | 3.8 | I-9 | 4.1 | I-9 | 4.5 |
| I-9 | 3.8 | I-8 | 4.3 | I-8 | 4.5 | I-8 | 5.0 |
| II-1 | 17.0 | II-1 | 17.0 | II-1 | 18.0 | II-3 | 12.5 |
| II-2 | 25.5 | II-2 | 25.5 | II-2 | 27.0 | II-5 | 12.5 |
| VII-1 | 7.5 | VI-4 | 15.0 | VI-3 | 10.0 | II-7 | 12.5 |
| VII-2 | 7.5 | | | | | II-8 | 12.5 |

| Composition Q (wt %) | | Composition R (wt %) | | Composition S (wt %) | | Composition T (wt %) | |
|---|---|---|---|---|---|---|---|
| I-5 | 17.4 | I-5 | 16.2 | I-5 | 12.2 | I-5 | 12.2 |
| I-3 | 17.4 | I-3 | 16.2 | I-3 | 12.1 | I-3 | 12.1 |
| I-9 | 3.9 | I-9 | 3.6 | I-9 | 2.7 | I-9 | 2.7 |
| I-8 | 4.3 | I-8 | 4.0 | I-8 | 3.0 | I-8 | 3.0 |
| II-3 | 14.0 | II-3 | 5.0 | II-3 | 10.0 | II-3 | 5.0 |
| II-6 | 14.0 | II-4 | 5.0 | II-6 | 15.0 | II-4 | 5.0 |
| II-10 | 14.0 | II-6 | 10.0 | II-10 | 30.0 | II-6 | 5.0 |
| IV-1 | 15.0 | II-9 | 5.0 | IV-1 | 15.0 | II-8 | 5.0 |
| | | II-10 | 15.0 | | | II-10 | 25.0 |
| | | IV-1 | 20.0 | | | IV-1 | 25.0 |

| Composition U (wt %) | |
|---|---|
| I-3 | 12.1 |
| I-5 | 12.2 |
| I-8 | 3.0 |
| I-9 | 2.7 |
| II-3 | 5.0 |
| II-4 | 5.0 |
| II-6 | 5.0 |
| II-8 | 5.0 |
| II-10 | 20.0 |
| IV-1 | 30.0 |

Measurement of Properties

The above compositions were poured into a cell, which has a thickness of 12 μm, is provided with an aligning film of the polyimide, and has been subjected to parallel rubbing treatment, and the phase transition was observed under a polarizing microscope to measure the phase transition temperature at the time of temperature falling (−2° C./min). The results are given in Table 3. In Table 3, I represents an isotropic liquid, $S_A$ a smectic A phase, $S_c$ a smectic C phase, $S_x$ a smectic X phase (the X phase being a smectic phase which cannot be identified as a general phase, such as $S_A$ or $S_c$), N a nematic phase, and C a crystal. Further, −20↓ represents that the phase transition temperature is −20° C. or below.

EXAMPLE 1

0.02 part by weight of a dichroic dye (S-428, manufactured by Mitsui Toatsu Chemicals, Inc.) was added to 1 part by weight of each of the smectic liquid crystal compositions A to U prepared above. 1 part by weight of polydiisopropyl fumarate (molecular weight 265,000, decomposition temperature 253.4° C.) was added to each of the mixed solutions, followed by dissolution in 8 parts by weight of toluene. The decomposition temperature was measured by thermogravimetric analysis (TGA), and the molecular weight was determined by gel chromatography using a standard polyester (the same shall apply hereinafter).

For comparison, 0.04 part by weight of a dichroic dye (S-428, manufactured by Mitsui Toatsu Chemicals, Inc.) was added to 2 parts by weight of a liquid crystal composition (S-6, manufactured by Merck), and 8.16 parts by weight of a 10 wt % aqueous solution of PVA (EG-05, manufactured by Nippon Synthetic Chemical Industry Co., Ltd.; degree of polymerization 500; degree of saponification 86.5 to 89.0) was added to the mixed solution, followed by mechanical dispersion.

12.24 g of a 10 wt % aqueous solution of PVA (KH-20, manufactured by Nippon Synthetic Chemical Industry Co., Ltd.; degree of polymerization 2000; degree of saponification 78.5 to 81.5) was added as a thickening agent to the dispersion, and the mixture was stirred.

These mixed solutions and dispersions were each coated on an ITO-deposited white polyethylene terephthalate substrate by means of a doctor blade, and the coatings were dried to form liquid crystal/polymer composite films. Subsequently, an ultraviolet curable resin (urethane acrylate) was coated on the whole surface of composite film by means of a doctor blade, and the resultant coatings were cured by irradiation with ultraviolet light from a high-pressure mercury lamp (output: 120 W/cm$^2$) to form protective layers. Thus, record display media according to the present invention were prepared.

For record display media using the liquid crystal/polymer composite films thus prepared, corona discharge (corona voltage: 6.5 kV) gave rise to an erased state, while thermal recording by means of a thermal head or the like gave rise to writing.

The reflection density of the written area of the record display media in the above written state and the reflection density of the erased area were measured at room temperature with a color densitometer (RD 914-S, manufactured by Macbeth), the record display media were stored in a thermostatic chamber at 60° C. and −40° C. for 90 hr. The reflection density of the erased state was then measured, and the percentage change of reflection density in the erased state was calculated by the following equation. The results are given as the storage stability in Table 3.

$$\text{Change of reflection density (\%)} = \frac{\dfrac{\text{Reflection density of erased area after storing}}{\text{Initial reflection density of written area}} - \dfrac{\text{Initial reflection density of erased area}}{\text{Initial reflection density of erased area}}}{} \times 100$$

Further, the reflection density in the erased state was determined by taking the reflection density in the written state as 1.00, and the reflection density in the erased state was subtracted from the reflection density in the written state to determine the contrast. The results are also summarized in Table 3.

As is apparent from the results, the record display media of the present invention are superior to the comparative record display medium in high-temperature storage stability, low-temperature storage stability, moisture resistance, and contrast.

TABLE 3

| Composition | Phase transition temp. (°C.) | Storage stability at 60° C. | Storage stability at −40° C. | Storage stability at 30° C. and 90% RH | Contrast |
|---|---|---|---|---|---|
| A | I(71)$S_A$(−20↓)C | 91 | 6 | 7 | 0.37 |
| B | I(72)$S_A$(−20↓)C | 70 | 19 | 36 | 0.29 |
| C | I(91)N(80)$S_A$(−11))$S_c$(−17)C | 56 | 40 | 19 | 0.39 |
| D | I(86)N(81)$S_A$(−20↓)C | 17 | 5 | 6 | 0.46 |
| E | I(101)N(89)$S_A$(−20↓)C | 10 | 5 | 3 | 0.52 |
| F | I(82)$S_A$(−20↓)C | 1 | 5 | 6 | 0.43 |
| G | I(97)N(94)$S_A$(−19)C | 2 | 2 | 5 | 0.42 |
| H | I(113)N(100)$S_A$(10)C | 5 | 13 | 7 | 0.43 |
| I | I(94)N(79)$S_A$(77)$S_A$(−20↓)C | 69 | 34 | 10 | 0.39 |
| J | I(88)N(74)$S_A$(19)$S_A$(−20↓)C | 9 | 12 | 6 | 0.45 |
| K | I(85)$S_A$(−20↓)C | 47 | 5 | 4 | 0.46 |
| L | I(85)$S_A$(−20↓)C | 3 | 3 | 4 | 0.46 |
| M | I(83)$S_A$(−20↓)C | 8 | 7 | 5 | 0.45 |
| N | I(88)$S_A$(−16)C | 2 | 2 | 2 | 0.38 |
| O | I(84)$S_A$(−20↓)C | 1 | 2 | 1 | 0.36 |
| P | I(85)$S_A$(−12)C | 4 | 9 | 1 | 0.38 |
| Q | I(98)$S_A$(−18)C | 4 | 1 | 3 | 0.43 |
| R | I(110)$S_A$(−17)C | 3 | 1 | 2 | 0.45 |
| S | I(111)$S_A$(−20↓)C | 7 | −3 | 5 | 0.39 |
| T | I(117)$S_A$(−20↓)C | 0 | −3 | 1 | 0.41 |
| U | I(124)$S_A$(−20↓)C | 3 | −10 | 1 | 0.40 |
| Comp. Ex. | I(59)S | 100 | 70 | 67 | 0.40 |

EXAMPLE 2

A record display medium was prepared in the same manner as in Example 1, except that the smectic liquid crystal composition H and polydiisopropyl fumarate were used. The record display medium thus prepared was subjected to corona discharge (corona voltage: 6.5 kV) to bring the medium to an erased state. It was then stored at various temperatures to determine the percentage change of reflection density. The results are shown in FIG. 1. Further, data which have been differentiated with respect to the temperature are also shown in FIG. 1.

The temperature of the phase transition from the smectic phase to the nematic phase for the smectic liquid crystal composition H used in this case was 100° C., and, as can be judged from the differentiated data for the data on the percentage change of reflection density, the temperature at which the percentage change of reflection density was maximum was 95° C. This maximum value shows the heat resistance of the record display medium.

A smaller difference between the smectic to nematic phase transition temperature of the liquid crystal and the temperature at which the change of reflection density of the record display medium using the liquid crystal/polymer composite film is maximum means that the properties of the liquid crystal per se are better exhibited. Use of polymeric materials, which can satisfactorily bring out the properties of the liquid crystal, is important for record display media using liquid crystal/polymer composite film. The polymeric material of the present invention can satisfactorily utilize the properties of the liquid crystal.

Thus, the use of the polymeric material of the present invention enables the heat resistance of the record display medium using the liquid crystal/polymer composite film to be suppressed to 20° C. or below of the phase transition temperature of the liquid crystal used, permitting the ability of the liquid crystal used to be satisfactorily brought out.

For the differentiated data shown in FIG. 1, the half value width is about 8° C. The smaller the half value width, the sharper the percentage change of reflection density as a function of the storage temperature. In the case of a display medium having a large half value width, the contrast unfavorably changes with the temperature even though the temperature at which the change of reflection density is maximum is high. The display medium, which causes a gradual change, and the polymeric material used for such a display medium are unsuitable. The temperature, at which the change of reflection density is maximum, and the half value width depend upon the polymeric material. Therefore, the selection of the polymeric material is important.

EXAMPLE 3

Figure 2:
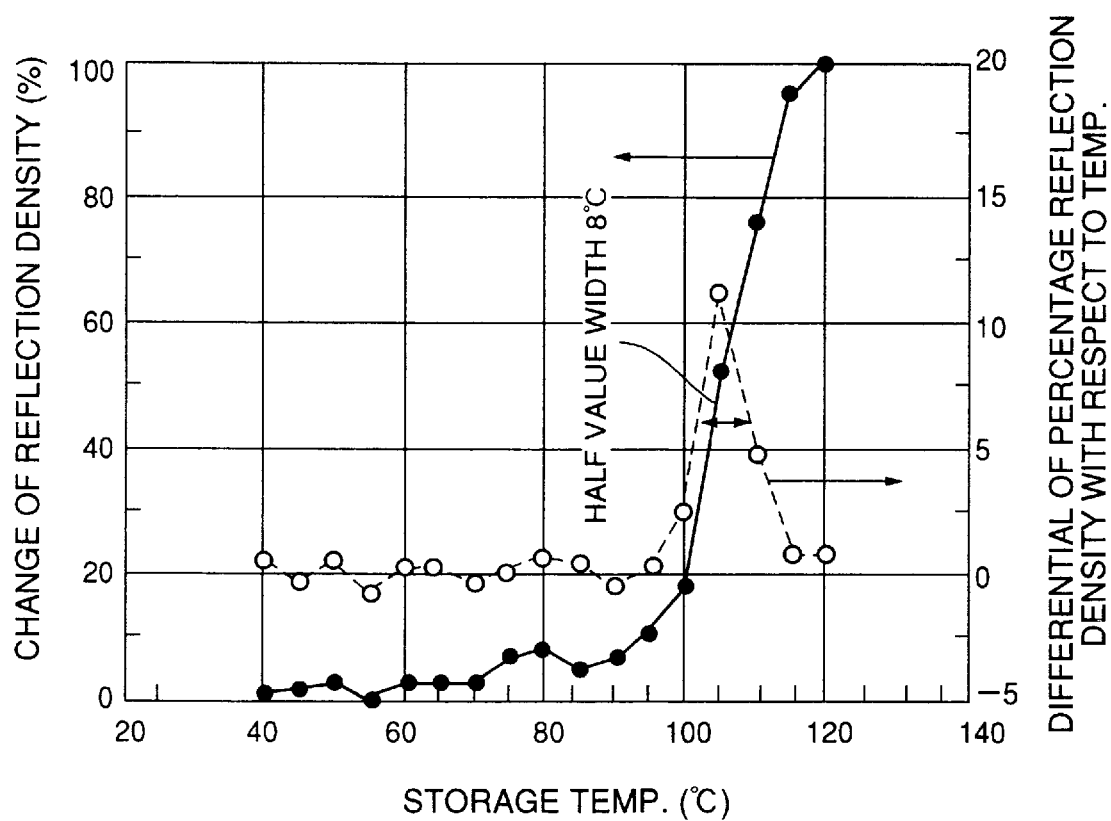

The record display medium of the present invention was prepared in the same manner as in Example 2, except that the smectic liquid crystal composition T was used instead of the smectic liquid crystal composition H in Example 2. This record display medium was subjected to corona discharge (corona voltage: 6.5 kV) to bring the medium to an erased state in the same manner as in Example 2. It was then stored at various temperatures to determine the percentage change of reflection density. The results are shown in FIG. 2. Further, data which have been differentiated with respect to the temperature are also shown in FIG. 2.

The temperature, at which the change of reflection density was maximum, was 105° C. with the half value width being about 8° C. The smectic to isotropic phase transition temperature for the smectic liquid crystal composition T was 117° C. Thus, the polymeric material of the present invention could satisfactorily bring out the properties of the liquid crystal used.

COMPARATIEVE EXAMPLE 1

Figure 3:
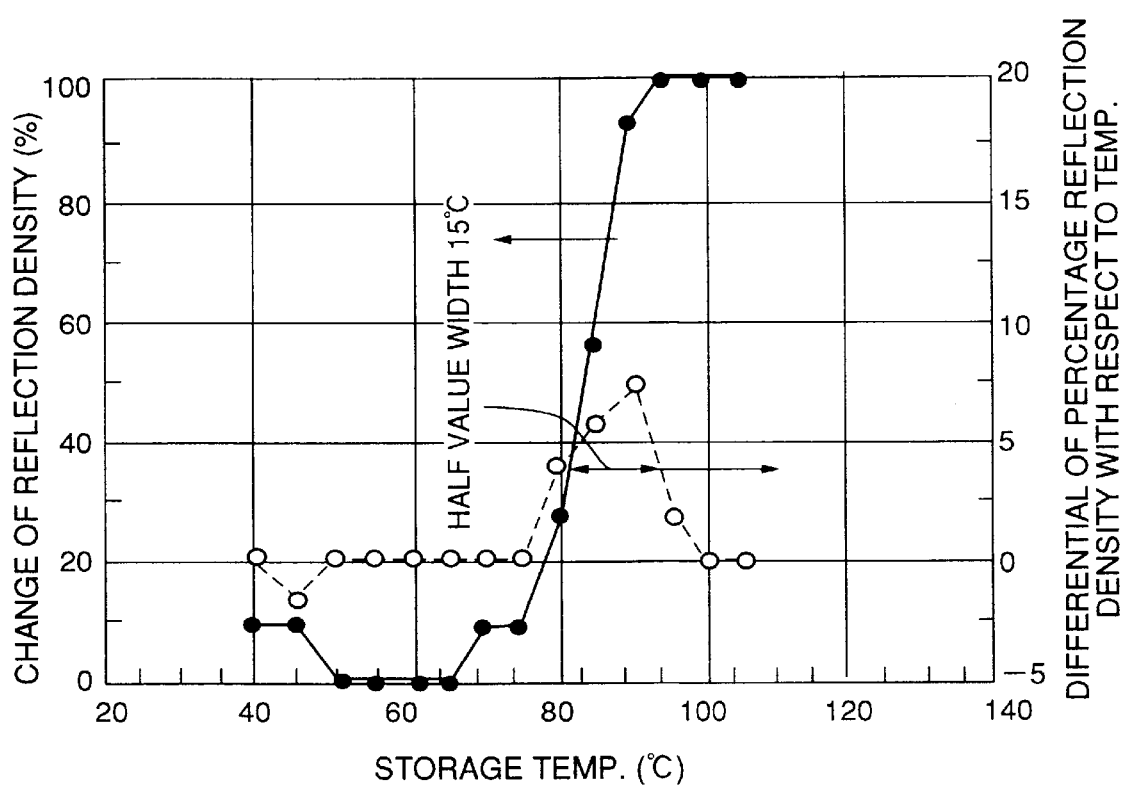

A record display medium was prepared in the same manner as in Example 2, except that polymethyl methacrylate (PMMA) (M.W.:15,000, manufactured by Junsei Kagaku K.K., Japan) was used instead of polydiisopropyl fumarate as the polymeric material. This record display medium was subjected to corona discharge (corona voltage: 6.5 kV) to bring the medium to an erased state. It was then stored at various temperatures to determine the percentage change of reflection density. The results are shown in FIG. 3. Further, data which have been differentiated with respect to the temperature are also shown in FIG. 3.

The temperature, at which the change of reflection density was maximum, was 90° C. with the half value width being as large as about 15° C., indicating that the percentage change of reflection density did not change sharply. The temperature, at which the percentage change of reflection density began to change, was 75° C., indicating that the heat resistance was inferior to that in Example 2 using the same liquid crystal composition.

EXAMPLE 4

0.02 part by weight of a dichroic dye (S-428, manufactured by Mitsui Toatsu Chemicals, Inc.) was added to 1 part by weight of the smectic liquid crystal composition H. 1 part by weight of polydiisopropyl fumarate (molecular weight 265,000, decomposition temperature 253.4° C.) was added to the mixed solution, followed by dissolution in 8 parts by weight of toluene.

For comparison, mixed solutions were prepared in the same manner as described just above, except that, instead of polydiisopropyl fumarate, 1 part by weight of polymethyl methacrylate (manufactured by Junsei Kagaku) was used for one comparative mixed solution and 1 part by weight of polystyrene (manufactured by Junsei Kagaku K.K., M.W.:15,000) was used for another comparative mixed solution.

The above three mixed solutions were each coated on an ITO-deposited white polyethylene terephthalate substrate by means of a doctor blade, and the coatings were dried to form liquid crystal/polymer composite films. Subsequently, an ultraviolet curable resin (urethane acrylate) was coated on the whole surface of composite film by means of a doctor blade, and the resultant coatings were cured by irradiation with ultraviolet light from a high-pressure mercury lamp (output: 120 W/cm$^2$) to form protective layers. Thus, record display media of the present invention and comparative record display media were prepared.

For the three record display media thus prepared, the reflection density of the area from which information had been erased by application of an electric field was measured with a color densitometer (RD 914-S, manufactured by Macbeth), and, further, the contrast was also measured. The results were as tabulated in Table 4.

TABLE 4

| Polymeric material | Contrast |
|---|---|
| Polydiisopropyl fumarate | 0.42 |
| Polymethyl methacrylate | 0.33 |
| Polystyrene | 0.31 |

Example 4 demonstrates that the record display medium using polymethyl methacrylate as the polymeric material has low heat resistance and, in addition, low contrast.

Thus, since the polymeric material of the present invention is not dyeable with a dichroic dye, recording media using the polymeric material of the present invention exhibit higher contrast than recording media using other matrix resins, indicating that the record display media using the polymeric material of the present invention have excellent visibility.

EXAMPLE 5

0.02 part by weight of a dichroic dye (S-428, manufactured by Mitsui Toatsu Chemicals, Inc.) was added to 1 part by weight of the smectic liquid crystal composition H. 1 part by weight of a diisopropyl fumarate/allyl acetate copolymer (comonomer molar ratio 75/25, molecular weight 83,000, decomposition temperature 274.4° C.) was added to the mixed solution, followed by dissolution in 8 parts by weight of toluene.

This mixed solution was coated on an ITO-deposited white polyethylene terephthalate film substrate by means of a doctor blade, and the coating was dried to form a dried film. Subsequently, an ultraviolet curable resin (urethane acrylate) was coated on the whole surface of composite film by means of a doctor blade, and the resultant coating was cured by irradiation with ultraviolet light from a high-pressure mercury lamp (output: 120 W/cm$^2$) to form a protective layer, thereby preparing a record display medium of the present invention.

For this record display medium, erasing of information was performed at a corona voltage of 6.5 kV, and recording was performed by means of a thermal head. As a result, the reflection density of the recording medium in its area from which information had been erased was 0.690, while the reflection density of the written area was 1.204. This rewritable record display medium was held at 60° C. for 90 hr. As a result, the reflection density of the erased area was 0.734. That is, the percentage change of reflection density in the erased area was as small as 9%, indicating that high memory effect could be provided. The record display medium on which information had been recorded by means of the thermal head was stored under conditions of 30° C. and 90% RH for 90 hr. As a result, the percentage change of reflection density was as low as 6%, indicating that high memory effect could be provided.

EXAMPLE 6

A record display medium of the present invention was prepared and evaluated in the same manner as in Example 4, except that a diisopropyl fumarate/vinyl acetate copolymer (comonomer molar ratio 75/25, molecular weight 276,000, decomposition temperature 267.5° C.) was used.

As a result, the reflection density of the recording medium in its area from which information had been erased was 0.698, while the reflection density of the written area was 1.290. This rewritable record display medium was held at 60° C. for 90 hr. As a result, the reflection density of the erased area was 0.745. That is, the percentage change of reflection density in the erased area was as small as 8%, indicating that high memory effect could be provided. The record display medium on which information had been recorded by means of the thermal head was stored under conditions of 30° C. and 90% RH for 90 hr. As a result, the percentage change of reflection density in the erased area was as low as 6%, indicating that high memory effect could be provided.

EXAMPLE 7

A record display medium of the present invention was prepared and evaluated in the same manner as in Example 4, except that a diisopropyl fumarate/methyl methacrylate copolymer (comonomer molar ratio 75/25, molecular weight 124,000, decomposition temperature 268.7° C.) was used.

As a result, the reflection density of the recording medium in its area from which information had been erased was 0.642, while the reflection density of the written area was 1.056. This rewritable record display medium was held at 60° C. for 90 hr, and the reflection density of the erased area was then measured and found to be 0.657. That is, the percentage change of reflection density in the erased area was as small as 4%, indicating that high memory effect could be provided. The record display medium on which information had been recorded by means of the thermal head was stored under conditions of 30° C. and 90% RH for 90 hr. As a result, the percentage change of reflection density in the erased area was as low as 4%, indicating that high memory effect could be provided.

EXAMPLE 8

0.02 part by weight of a dichroic dye (S-428, manufactured by Mitsui Toatsu Chemicals, Inc.) was added to 1 part by weight of the smectic liquid crystal composition U. 0.38 part by weight of polydiisopropyl fumarate (molecular weight 265,000, decomposition temperature 253.4° C.), 0.51 part by weight of a vinyl chloride/vinyl acetate copolymer resin (Vinylight VAGH, manufactured by Union Carbide), and 0.61 part by weight of a polyester resin (Vylon #200, manufactured by Toyobo Co., Ltd.) were added to the mixed solution, followed by dissolution in a mixed solvent of 3.7 parts by weight of toluene, 0.13 part by weight of methyl ethyl ketone, and 0.02 part by weight of ethyl acetate.

This mixed solution was coated on an ITO-deposited white polyethylene terephthalate film substrate by means of a doctor blade, and the coating was dried to form a dried film. Subsequently, an ultraviolet curable resin (urethane acrylate) was coated on the whole surface of composite film by means of a doctor blade, and the resultant coating was cured by irradiation with ultraviolet light from a high-pressure mercury lamp (output: 120 W/cm$^2$) to form a protective layer, thereby preparing a record display medium of the present invention.

For this record display medium, erasing of information was performed at a corona voltage of 6.5 kV, and recording was performed by means of a thermal head. As a result, the reflection density of the recording medium in its area from which information had been erased was 0.492, while the reflection density of the written area was 0.910. This rewritable record display medium was held at 60° C. for 90 hr. As a result, the reflection density of the erased area was 0.504. That is, the percentage change of reflection density in the erased area was as small as 3%, indicating that high memory effect could be provided. The record display medium on which information had been recorded by means of the thermal head was stored under conditions of 30° C. and 90% RH for 90 hr. As a result, the percentage change of reflection density in the erased area was as low as 1%, indicating that high memory effect could be provided.

EXAMPLE 9

A record display medium of the present invention was prepared and evaluated in the same manner as in Example 7, except that the smectic liquid crystal composition H was used.

As a result, the reflection density of the recording medium in its area from which information had been erased was 0.606, while the reflection density of the written area was 1.070. This rewritable record display medium was held at 60° C. for 90 hr. As a result, the reflection density of the erased area was 0.622. That is, the percentage change of reflection density in the erased area was as small as 3%, indicating that high memory effect could be provided. The record display medium on which information had been recorded by means of the thermal head was stored under conditions of 30° C. and 90% RH for 90 hr. As a result, the percentage change of reflection density in the erased area was as low as 2%, indicating that high memory effect could be provided.

EXAMPLE 10

1 part by weight of a smectic liquid crystal composition (13686, manufactured by Merck), 0.02 part by weight of a dichroic dye (S-428, manufactured by Mitsui Toatsu Chemicals, Inc.), and 1 part by weight of polydiisopropyl fumarate (molecular weight 265,000, decomposition temperature 253.4° C.) were dissolved in 4 parts by weight of toluene.

This mixed solution was coated on an ITO-deposited white polyethylene terephthalate substrate film by means of a doctor blade to form a coating having an even thickness, and the coating was dried to form a smectic liquid crystal/polymer composite film (thickness: 10.0 $\mu$m). The resultant laminate sheet was stamped into a card having a size of 85 mm×54 mm to prepare a rewritable card. At this point the liquid crystal layer was in a colored, opaque state.

The liquid crystal in this card was aligned by corona discharge to render the liquid crystal layer transparent (this state being called "initially erased state"), and printing was performed by means of a thermal head to display an image (this state being called "initially written state"). The reflection density was measured for each state. The card was then stored for 90 hr in a thermostatic chamber kept at 60° C., and the reflection density of the area in erased state (reflection density in erased area after storage) was measured. The percentage change of reflection density was calculated from these reflection density values by the above equation. As a result, it was found that the percentage change was as low as 7%, indicating that high memory effect could be provided even at a high temperature. This demonstrates that the card has excellent heat resistance.

A card was prepared and subjected to printing in the same manner as described just above and stored for 90 hr in a thermostatic chamber kept at 30° C. and 90% RH, and the reflection density of the area in erased state (reflection density in erased area after storage) was measured. The percentage change of reflection density was calculated from these reflection density values. As a result, it was found that the percentage change was as low as 3%, indicating that high memory effect could be provided even under high humidity. This demonstrates that the card has excellent moisture resistance.

EXAMPLE 11

1 part by weight of a smectic liquid crystal composition (17215, manufactured by Merck), 0.02 part by weight of a dichroic dye (S-428, manufactured by Mitsui Toatsu Chemicals, Inc.), and 1 part by weight of a diisopropyl fumarate/vinyl acetate copolymer (comonomer molar ratio 75:25, molecular weight 276,000, decomposition temperature 267.5° C.) were dissolved in 4 parts by weight of toluene.

This mixed solution was coated on an ITO-deposited white polyethylene terephthalate substrate film by means of a doctor blade to form a coating having an even thickness, and the coating was dried to form a smectic liquid crystal/polymer composite film (thickness: 10.0 μm). The resultant laminate sheet was stamped into a card having a size of 85 mm×54 mm to prepare a rewritable card.

The liquid crystal in this card was aligned by corona discharge to render the liquid crystal layer transparent, and printing was performed by means of a thermal head to display an image. The reflection density was measured for each state. The card was then stored for 90 hr in a thermostatic chamber kept at 60° C., and the reflection density of the area in erased state was measured. The percentage change of reflection density was calculated from these reflection density values by the above equation. As a result, it was found that the percentage change was as low as 4%, indicating that high memory effect could be provided even at a high temperature. This demonstrates that the card has excellent heat resistance.

A card was prepared and subjected to printing in the same manner as described just above and stored for 90 hr in a thermostatic chamber kept at 30° C. and 90% RH, and the reflection density of the area in erased state was measured. The percentage change of reflection density was calculated from these reflection density values. As a result, it was found that the percentage change was as low as 6%, indicating that high memory effect could be provided even under high humidity. This demonstrates that the card has excellent moisture resistance.

EXAMPLE 12

A rewritable card was prepared in the same manner as in Example 2, except that a diisopropyl fumarate/methyl methacrylate copolymer (comonomer molar ratio 75:25, molecular weight 124,000, decomposition temperature 268.7° C.) was used instead of the diisopropyl fumarate/vinyl acetate copolymer in Example 2.

The liquid crystal in this card was aligned by corona discharge to render the liquid crystal layer transparent, and printing was performed by means of a thermal head to display an image. The reflection density was measured for each state. The card was then stored for 90 hr in a thermostatic chamber kept at 60° C., and the reflection density of the area in erased state was measured. The percentage change of reflection density was calculated from these reflection density values by the above equation. As a result, it was found that the percentage change was as low as 4%, indicating that high memory effect could be provided even at a high temperature. This demonstrates that the card has excellent heat resistance.

A card was prepared and subjected to printing in the same manner as described just above and stored for 90 hr in a thermostatic chamber kept at 30° C. and 90% RH, and the reflection density of the area in erased state was measured. The percentage change of reflection density was calculated from these reflection density values. As a result, it was found that the percentage change was as low as 6%, indicating that high memory effect could be provided even under high humidity. This demonstrates that the card has excellent moisture resistance.

EXAMPLE 13

A rewritable card was prepared in the same manner as in Example 2, except that a diisopropyl fumarate/allyl acetate copolymer (comonomer molar ratio 75:25, molecular weight 83,000, decomposition temperature 274.4° C.) was used instead of the diisopropyl fumarate/vinyl acetate copolymer in Example 2.

EXAMPLE 14

A rewritable card was prepared in the same manner as in Example 2, except that a diisopropyl fumarate/styrene copolymer (comonomer molar ratio 9:1) was used instead of the diisopropyl fumarate/vinyl acetate copolymer in Example 2.

For both Examples 13 and 14, the results were substantially the same as those of Examples 10 to 12 and were superior to those for light modulation devices, prepared by using polyvinyl alcohol as the polymer matrix.

EXAMPLE 15

0.04 part by weight of a dichroic dye (G241+G206+G472 (weight ratio=4:4:3), manufactured by Nihon Kanko Shikiso was added to 2 parts by weight of the smectic liquid crystal composition H (Table 3). The liquid crystal composition containing the dichroic dye was added to 30 parts by weight of a solution of 2.7 parts by weight of polymethyl methacrylate (PMMA M1002B, manufactured by Soken Chemical Engineering Co., Ltd., average molecular weight 300,000 to 550,000) and 0.3 part by weight of a plasticizer in 27 parts by weight of a solvent (toluene/methyl ethyl ketone/ethyl acetate), and the mixture was stirred for 10 hr at room temperature to prepare a solution. The solution was coated by means of a doctor blade onto an ITO-deposited white PET substrate, and the coating was dried to prepare 8 μm-thick liquid crystal/polymer composite film.

Further, an ultraviolet light curable resin (urethane acrylate) was coated by means of a doctor blade onto the whole surface of the liquid crystal/polymer composite film. The coating was irradiated with ultraviolet light emitted from a higher pressure mercury lamp (output 120 W/cm$^2$) to cure the coating, thereby forming a 2 μm-thick protective layer. Thus, a record display medium according to the present invention was prepared.

COMPARATIVE EXAMPLE 2

A comparative record display medium was prepared in the same manner as in Example 15, except that polymethyl methacrylate (PMMA BR-113, manufactured by Mitsubishi Rayon Co., Ltd., average molecular weight 30,000) was used instead of polymethyl methacrylate in Example 15.

A peel test, using a cellophane tape, and a pencil scratch test were made on the record display media prepared in Example 15 and Comparative Example 2. As a result, for the record display medium prepared in Example 15, the composite film was not peeled in the peel test, and the pencil hardness was HB to B. On the other hand, for the record display medium prepared in Comparative Example 2, the composite film was easily peeled in the peel test, and the pencil hardness was 3B.

For both the record display media prepared in Example 15 and Comparative Example 2, an erased state could provided by corona discharge (corona voltage 6.5 kv), and a written state could be provided by thermal recording using a thermal head or the like.

The lightness and the chroma for the written area and the erased area in the written state of the record display medium were measured with a spectrophotometric calorimeter (CM-1000R, manufactured by Minolta). The difference in lightness between the written area and the erased area was 11.1, and the difference in chroma between the written area and the erased area was 2.2, indicating that the displayed image had a high contrast.

Thus, the present example demonstrated that a combination of the polymer of the present invention with a liquid crystal and a dichroic dye can offer a particularly high difference in lightness and chroma between a written area and an erased area.

As is apparent from the foregoing description, according to the present invention, the use of a particular polymeric material as a matrix in a record display medium using a liquid crystal/polymer composite film can solve problems involved in the record display media of the prior art, such as disappearance of display under high temperature and/or high humidity conditions and, at the same time, can provide various rewritable record display media having improved reliability and stability as a device.

What is claimed is:

1. A polymeric material for a liquid crystal/polymer composite film comprising a liquid crystal present in a polymer matrix, wherein the polymeric material has a glass transition temperature or decomposition temperature of 150° C. to 274.4° C. and is soluble in an organic solvent and insoluble in water, and wherein the polymeric material comprises a polymer having repeating units represented by the following general formula (1):

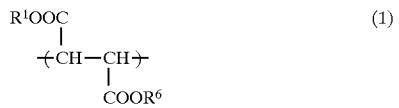

wherein $R^1$ and $R^6$ may be the same or different and represent a hydrocarbon group optionally having a hetero atom and/or a substituent.

2. The polymeric material according to claim 1, wherein the content of the repeating units represented by the general formula (1) is not less than 50% by mole.

3. The polymeric material according to claim 1, which further comprises at least one other polymeric material.

4. The polymeric material according to claim 3, wherein at least one of the other polymeric materials comprises a vinyl chloride/vinyl acetate copolymer resin and/or a polyester resin.

5. The polymeric material according to claim 1, wherein the polymer matrix comprises a polymer having repeating units represented by the general formula (A) and having an average molecular weight of 200,000 to 800,000:

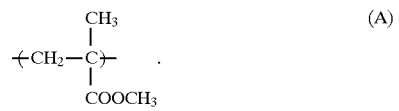

6. The polymeric material according to claim 5, wherein the polymer matrix comprises 90 to 100% by mole of the repeating units represented by the formula (A).

7. The polymeric material according to claim 5, wherein the polymer matrix comprises a copolymer comprised of 99 to 90% by mole of the repeating units represented by the formula (A) and 1 to 10% by mole of repeating units represented by the following formula (B):

8. The polymeric material according to claim 5, wherein the polymer matrix comprises a mixture of 99 to 90% by weight of a polymer comprising the repeating units represented by the formula (A) and 1 to 10% by weight of a polymer comprising the repeating units represented by the formula (B).

9. The polymeric material according to claim 5, wherein the polymer matrix contains at least one plasticizer.

10. The polymeric material according to claim 5, wherein the content of the plasticizer in the polymer matrix is 0.01 to 15.0% by weight.

11. A polymeric material for a liquid crystal/polymer composite film comprising a liquid crystal present in a polymer matrix, wherein the polymeric material comprises a polymer having repeating units represented by the following general formula (1):

wherein $R^1$ and $R^6$ may be the same or different and represent a hydrocarbon group optionally having a hetero atom and/or a substituent; and wherein the polymeric material is incompatible with the liquid crystal, causes phase separation from the liquid crystal and is not dyable with a dichroic dye.

12. A record display medium comprising a liquid crystal/polymer composite film comprising a liquid crystal present in a polymer matrix, wherein when a value obtained by differentiating a display density value for the liquid crystal/polymer composite film with respect to a storage temperature value is defined as a function, the function has a peak, with the difference between the temperature at which the maximum value is provided and the phase transition temperature of the liquid crystal being not more than 20° C., and the function having a half value width of not more than 10° C.

13. A liquid crystal/polymer composite film comprising a liquid crystal present in a polymer matrix, wherein the polymer matrix comprises a polymeric material having a glass transition temperature of 150° C. to 274.4° C., and wherein the polymeric material comprises a polymer having repeating units represented by the following general formula (1):

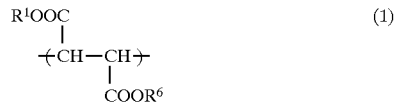

wherein $R^1$ and $R^6$ may be the same or different and represent a hydrocarbon group optionally having a hetero atom and/or a substituent.

14. The liquid crystal/polymer composite film according to claim 13, wherein the polymer matrix comprises a polymer having repeating units represented by the general formula (A) and having an average molecular weight of 200,000 to 800,000:

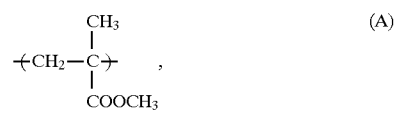

15. The liquid crystal/polymer composite film according to claim 14, wherein the polymer matrix comprises 90 to 100% by mole of the repeating units represented by the formula (A).

16. The liquid crystal/polymer composite film according to claim 14, wherein the polymer matrix comprises a copolymer comprised of 99 to 90% by mole of the repeating units represented by the formula (A) and 1 to 10% by mole of repeating units represented by the following formula (B):

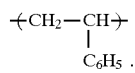 (B)

17. The liquid crystal/polymer composite film according to claim 14, wherein the polymer matrix comprises a mixture of 99 to 90% by weight of a polymer comprising the repeating units represented by the formula (A) and 1 to 10% by weight of a polymer comprising the repeating units represented by the formula (B).

18. The liquid crystal/polymer composite film according to claim 14, wherein the polymer matrix contains at least one plasticizer.

19. The liquid crystal/polymer composite film according to claim 14, wherein the content of the plasticizer in the polymer matrix is 0.01 to 15.0% by weight.

20. The liquid crystal/polymer composite film according to claim 13, wherein the liquid crystal is a smectic liquid crystal.

21. The liquid crystal/polymer composite film according to claim 13, wherein the liquid crystal is a smectic liquid crystal composition comprising: at least one member selected from compounds represented by the following general formula (I):

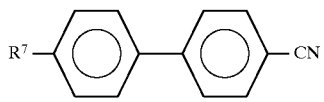 (I)

wherein $R^7$ represents an alkyl or alkoxy group having 8 to 18 carbon atoms; and at least one member selected from compounds represented by the following general formulae (II) to (VII):

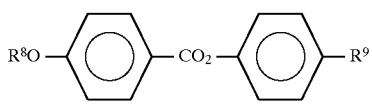 (II)

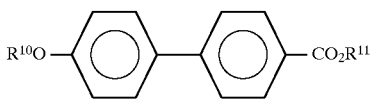 (III)

 (IV)

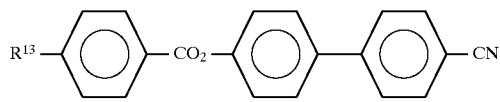 (V)

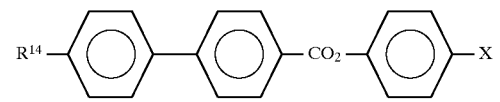 (VI)

 (VII)

wherein $R^8$, $R^{10}$, $R^{11}$, and $R^{12}$ represent an alkyl group having 2 to 18 carbon atoms, $R^9$, $R^{13}$, $R^{14}$, $R^{15}$, and $R^{16}$ represent an alkyl or alkoxy group having 2 to 18 carbon atoms, and X represents a halogen atom or an alkyl or alkoxy group having 2 to 18 carbon atoms.

22. The liquid crystal/polymer composite film according to claim 21, wherein the liquid crystal comprises at least one compound represented by the general formula (I), at least one compound represented by the general formula (II), and at least one compound represented by the general formulae (IV) to (VII).

23. The liquid crystal/polymer composite film according to claim 13, wherein the liquid crystal is a liquid crystal mixture having the following composition:

 .....10 to 20% by weight

 .....10 to 20% by weight

 .....1 to 10% by weight

 .....1 to 10% by weight

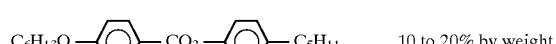 .....10 to 20% by weight

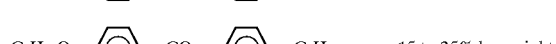 .....15 to 25% by weight

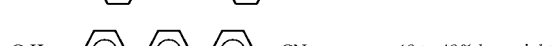 .....10 to 40% by weight.

24. The liquid crystal/polymer composite film according to claim 13, wherein the polymeric material comprises not less than 50% by mole of repeating units represented by the general formula (1).

25. The liquid crystal/polymer composite film according to claim 13, which further comprises at least one other polymeric material.

26. The liquid crystal/polymer composite film according to claim 24, wherein at least one of the other polymeric materials comprises a vinyl chloride/vinyl acetate copolymer resin and/or polyester resin.

27. The liquid crystal/polymer composite film according to claim 13, wherein the weight ratio of the liquid crystal to the polymeric material is 35:65 to 45:55.

28. The liquid crystal/polymer composite film according to claim 13, which has a thickness of 3 to 23 μm.

29. The liquid crystal/polymer composite film according to claim 13, wherein the liquid crystal contains a dichroic dye.

30. The liquid crystal/polymer composite film according to claim 29, wherein the dichroic dye is a black dichroic dye comprising a mixture of azo dichroic dyes.

31. A liquid crystal/polymer composite film comprising a liquid crystal present in a polymer matrix, wherein the polymeric material comprises a polymer having repeating units represented by the following general formula (1):

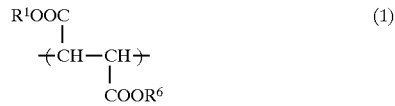 (1)

wherein $R^1$ and $R^6$ may be the same or different and represent a hydrocarbon group optionally having a hetero atom and/or a substituent; and wherein the polymer matrix comprises a polymeric material which is incompatible with the liquid crystal, causes phase separation from the liquid crystal and is not dyable with a dichroic dye.

32. A liquid crystal/polymer composite film comprising a liquid crystal present in a matrix, wherein when a value obtained by differentiating a display density value for the liquid crystal/polymer composite film with respect to a storage temperature value is defined as a function, the function has a peak, with the difference between the temperature at which the maximum value is provided and the phase transition temperature of the liquid crystal being not more than 20° C., and the function having a half width of not more than 10° C.

33. A record display medium comprising, a liquid crystal/polymer composite film, according to any one of claims 13 or 14–32, provided on a conductive substrate.

34. The record display medium according to claim 33, wherein a protective layer is provided on the liquid crystal/polymer composite film.

35. A method of use of a record display medium according to claim 33 for recording and erasing information, comprising:
   (a) aligning the liquid crystal by means of an electric field, thereby rendering the liquid crystal and polymer composite film transparent;
   (b) heating the liquid crystal to record the information, thereby disturbing the alignment of liquid crystal and bringing the liquid crystal/polymer composite film to a state of scatter and absorption; and
   (c) erasing the recorded information by heating or by applying an electric field to the liquid crystal.

36. A method of use of a record display medium according claim 33 for recording and erasing information, comprising:
   (a) heating the liquid crystal, thereby disturbing the alignment of the liquid crystal and bringing the liquid crystal/polymer composite film to a state of scatter and absorption;
   (b) aligning the liquid crystal by means of an electric field to record information, thereby rendering the liquid crystal/polymer composite film transparent; and
   (c) erasing the recorded information by heating or by applying an electric field to the liquid crystal.

37. The record display medium according to claim 33, which has a difference in lightness between a written area and an erased area, $|\Delta L^*|$, in the range of from 5 to 25.

38. The record display medium according to claim 33, which has a difference in chroma between a written area and an erased area, $|\Delta C^*|$, in the range of from 0 to 10.

* * * * *